United States Patent
Danziger

(10) Patent No.: US 11,849,262 B2
(45) Date of Patent: Dec. 19, 2023

(54) IMAGE PROJECTOR

(71) Applicant: Lumus Ltd., Ness Ziona (IL)

(72) Inventor: Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 219 days.

(21) Appl. No.: 17/311,367

(22) PCT Filed: Jun. 13, 2019

(86) PCT No.: PCT/IB2019/054956
§ 371 (c)(1),
(2) Date: Jun. 7, 2021

(87) PCT Pub. No.: WO2020/183229
PCT Pub. Date: Sep. 17, 2020

(65) Prior Publication Data
US 2022/0030205 A1    Jan. 27, 2022

Related U.S. Application Data

(60) Provisional application No. 62/816,948, filed on Mar. 12, 2019.

(51) Int. Cl.
*H04N 9/31* (2006.01)
*G02B 26/10* (2006.01)

(52) U.S. Cl.
CPC ......... *H04N 9/3135* (2013.01); *G02B 26/101* (2013.01); *H04N 9/3164* (2013.01)

(58) Field of Classification Search
CPC .. H04N 9/3135; H04N 9/3164; H04N 9/3102; H04N 9/3129; H04N 9/3138;
(Continued)

(56) References Cited

U.S. PATENT DOCUMENTS 2,748,659 A   6/1956   Geffcken et al.
2,958,258 A   11/1960  Kelly
(Continued)

FOREIGN PATENT DOCUMENTS

CN   1606712   4/2005
CN   1795399   6/2006
(Continued)

OTHER PUBLICATIONS

Mukawa et al; "A full-color eyewear display using planar waveguides with reflection volume holograms" Journal of the SID 17/3,200.
(Continued)

*Primary Examiner* — Michael Lee
(74) *Attorney, Agent, or Firm* — Mark M. Friedman

(57) ABSTRACT

An image projector includes an illumination arrangement with a number of illumination sources and a tilt-mirror assembly, all operating under control of a controller. An optical arrangement directs illumination from the illumination sources towards the mirror and on to an image plane. A collimating arrangement collimates the illumination from the image plane to generate a collimated image directed to an exit stop. The controller (830) modulates an intensity of each of the illumination sources (808) synchronously with tilt motion of the mirror (814) according to the content of the digital image. In certain implementations, the illumination sources (808) are spaced apart. Although the tilt motion brings each illumination source to scans across only part of a dimension of the field of view, all of the illumination sources together scans across the entirety of the one dimension.

13 Claims, 15 Drawing Sheets

(58) Field of Classification Search
CPC .. H04N 9/3152; H04N 9/3161; H04N 9/3173; G02B 26/101; G02B 2027/0112; G02B 2027/0123; G02B 27/0172; G02B 26/0816; G02B 27/18; G02B 27/017; G03B 21/28

See application file for complete search history.

(56) References Cited

U.S. PATENT DOCUMENTS

| | | |
|---|---|---|
| 3,626,394 A | 12/1971 | Nelson et al. |
| 3,667,621 A | 6/1972 | Barlow |
| 3,737,212 A | 6/1973 | Antonson et al. |
| 3,807,849 A | 4/1974 | Lobb |
| 3,829,197 A | 8/1974 | Thelen |
| 3,873,209 A | 3/1975 | Schinke et al. |
| 3,940,204 A | 2/1976 | Withrington |
| 3,969,023 A | 7/1976 | Brandt et al. |
| 4,084,883 A | 4/1978 | Eastman et al. |
| 4,233,526 A | 11/1980 | Kurogi et al. |
| 4,240,738 A | 12/1980 | Praamsma |
| 4,309,070 A | 1/1982 | St Leger Searle |
| 4,331,387 A | 5/1982 | Wentz |
| 4,372,639 A | 2/1983 | Johnson |
| 4,383,740 A | 5/1983 | Bordovsky |
| 4,516,828 A | 5/1985 | Steele |
| 4,613,216 A | 9/1986 | Herbec et al. |
| 4,711,512 A | 12/1987 | Upatnieks |
| 4,755,667 A | 7/1988 | Marsoner et al. |
| 4,775,217 A | 10/1988 | Ellis |
| 4,798,448 A | 1/1989 | Van Raalte |
| 4,799,765 A | 1/1989 | Ferrer |
| 4,805,988 A | 2/1989 | Dones |
| 4,932,743 A | 6/1990 | Isobe et al. |
| 5,033,828 A | 7/1991 | Haruta |
| 5,076,664 A | 12/1991 | Migozzi |
| 5,096,520 A | 3/1992 | Faris |
| 5,208,800 A | 5/1993 | Isobe et al. |
| 5,231,642 A | 7/1993 | Scifres et al. |
| 5,235,589 A | 8/1993 | Yokomori et al. |
| 5,278,532 A | 1/1994 | Hegg et al. |
| 5,301,067 A | 4/1994 | Bleier et al. |
| 5,353,134 A | 10/1994 | Michel et al. |
| 5,369,415 A | 11/1994 | Richard et al. |
| 5,453,877 A | 9/1995 | Gerbe et al. |
| 5,481,385 A | 1/1996 | Zimmerman et al. |
| 5,499,138 A | 3/1996 | Iba |
| 5,537,260 A | 7/1996 | Williamson |
| 5,539,578 A | 7/1996 | Togino et al. |
| 5,543,877 A | 8/1996 | Takashi et al. |
| 5,555,329 A | 9/1996 | Kuper et al. |
| 5,594,830 A | 1/1997 | Winston et al. |
| 5,608,742 A | 3/1997 | Petetson |
| 5,619,601 A | 4/1997 | Akashi et al. |
| 5,650,873 A | 7/1997 | Gal et al. |
| 5,680,209 A | 10/1997 | Maechler |
| 5,708,449 A | 1/1998 | Heacock et al. |
| 5,712,694 A | 1/1998 | Taira et al. |
| 5,724,163 A | 3/1998 | David |
| 5,751,480 A | 5/1998 | Kitagishi |
| 5,764,412 A | 6/1998 | Suzuki et al. |
| 5,808,709 A | 9/1998 | Davis |
| 5,808,800 A | 9/1998 | Handschy |
| 5,896,232 A | 4/1999 | Budd et al. |
| 5,966,223 A | 10/1999 | Amitai et al. |
| 5,982,536 A | 11/1999 | Swan |
| 5,999,836 A | 12/1999 | Nelson |
| 6,007,225 A | 12/1999 | Ramer et al. |
| 6,021,239 A | 2/2000 | Minami et al. |
| 6,034,750 A | 3/2000 | Rai et al. |
| 6,052,500 A | 4/2000 | Takano et al. |
| 6,091,548 A | 7/2000 | Chen |
| 6,144,347 A | 11/2000 | Mizoguchi et al. |
| 6,185,015 B1 | 2/2001 | Reinhorn et al. |
| 6,222,676 B1 | 4/2001 | Togino et al. |
| 6,222,677 B1 | 4/2001 | Budd et al. |
| 6,222,971 B1 | 4/2001 | Veligdan et al. |
| 6,239,092 B1 | 5/2001 | Papasso et al. |
| 6,256,151 B1 | 7/2001 | Ma et al. |
| 6,266,108 B1 | 7/2001 | Bao |
| 6,307,612 B1 | 10/2001 | Smith |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,400,493 B1 | 6/2002 | Mertz et al. |
| 6,404,550 B1 | 6/2002 | Yajima |
| 6,404,947 B1 | 6/2002 | Matsuda |
| 6,406,149 B2 | 6/2002 | Okuyama |
| 6,421,031 B1 | 7/2002 | Ronzani et al. |
| 6,433,339 B1 | 8/2002 | Maeda et al. |
| 6,480,174 B1 | 11/2002 | Kaufmass et al. |
| 6,483,113 B1 | 11/2002 | Sealy et al. |
| 6,490,087 B1 | 12/2002 | Fulkerson et al. |
| 6,490,104 B1 | 12/2002 | Gleckman et al. |
| 6,509,982 B2 | 1/2003 | Steiner |
| 6,542,307 B2 | 4/2003 | Gleckman |
| 6,671,100 B1 | 12/2003 | McRuer |
| 6,690,513 B2 | 2/2004 | Hulse et al. |
| 6,704,052 B1 | 3/2004 | Togino et al. |
| 6,704,065 B1 | 3/2004 | Sharp et al. |
| 6,799,859 B1 | 10/2004 | Ida et al. |
| 6,829,095 B2 | 12/2004 | Amitai |
| 6,879,443 B2 | 4/2005 | Spitzer et al. |
| 6,880,931 B2 | 4/2005 | Moliton et al. |
| 6,894,821 B2 | 5/2005 | Kotchick |
| 7,025,464 B2 | 4/2006 | Beeson et al. |
| 7,163,291 B2 | 1/2007 | Cado et al. |
| 7,206,479 B2 | 4/2007 | Wu et al. |
| 7,285,903 B2 | 10/2007 | Cull et al. |
| 7,384,159 B2 | 6/2008 | Takeda |
| 7,405,881 B2 | 7/2008 | Shimizu et al. |
| 7,418,170 B2 | 8/2008 | Mukawa et al. |
| 7,430,355 B2 | 9/2008 | Heikenfeld et al. |
| 7,448,170 B2 | 11/2008 | Skendzic Milovan et al. |
| 7,554,737 B2 | 6/2009 | Knox et al. |
| 7,612,879 B2 | 11/2009 | Stumpe et al. |
| 7,667,962 B2 | 2/2010 | Mullen |
| 7,672,055 B2 | 3/2010 | Amitai |
| 7,710,655 B2 | 5/2010 | Freeman et al. |
| 7,724,442 B2 | 5/2010 | Amitai |
| 7,751,122 B2 | 7/2010 | Amitai |
| 7,777,960 B2 | 8/2010 | Freeman |
| 7,778,508 B2 | 8/2010 | Hirayama |
| 7,808,625 B2 | 10/2010 | Nakamura et al. |
| 7,949,252 B1 | 5/2011 | Georgiev |
| 7,995,275 B2 | 8/2011 | Maeda et al. |
| 8,035,872 B2 | 10/2011 | Ouchi |
| 8,187,481 B1 | 5/2012 | Hobbs |
| 8,405,573 B2 | 3/2013 | Lapidot et al. |
| 8,467,133 B2 | 6/2013 | Miller |
| 8,472,119 B1 | 6/2013 | Kelly |
| 8,611,015 B2 | 12/2013 | Wheeler et al. |
| 8,655,178 B2 | 2/2014 | Capron et al. |
| 8,665,178 B1 | 3/2014 | Wang |
| 8,718,437 B2 | 5/2014 | Coe-Sullivan et al. |
| 8,724,222 B2 | 5/2014 | Chann et al. |
| 8,783,893 B1 | 7/2014 | Seurin et al. |
| 8,786,519 B2 | 7/2014 | Blumenfeld et al. |
| 8,854,734 B2 | 10/2014 | Ingram |
| 8,873,148 B1 | 10/2014 | Gupta |
| 8,913,865 B1 | 12/2014 | Bennett |
| 8,988,776 B2 | 3/2015 | Weber et al. |
| 8,998,414 B2 | 4/2015 | Bohn |
| 9,248,616 B2 | 2/2016 | Amitai |
| 9,523,852 B1 | 12/2016 | Brown et al. |
| 9,541,762 B2 | 1/2017 | Mukawa et al. |
| 9,551,880 B2 | 1/2017 | Amitai |
| 9,766,459 B2 | 9/2017 | Alton et al. |
| 9,798,061 B2 | 10/2017 | Hsiao et al. |
| 9,804,396 B2 | 10/2017 | Amitai |
| 9,805,633 B2 | 10/2017 | Zheng |
| 10,048,499 B2 | 8/2018 | Amitai |
| 10,088,633 B2 | 10/2018 | Mason |

(56) References Cited

U.S. PATENT DOCUMENTS

| | | |
|---|---|---|
| 10,222,535 B2 | 3/2019 | Remhof et al. |
| 10,302,957 B2 | 5/2019 | Sissom |
| 10,326,022 B2 | 6/2019 | Cheng et al. |
| 10,340,992 B2 | 7/2019 | Suzuki et al. |
| 10,564,430 B2 | 2/2020 | Amitai et al. |
| 10,571,699 B1 | 2/2020 | Parsons et al. |
| 10,768,432 B2 | 9/2020 | Amitai et al. |
| 10,951,867 B2 | 3/2021 | Pappas et al. |
| 2001/0030860 A1 | 10/2001 | Kimura et al. |
| 2002/0008708 A1 | 1/2002 | Weiss et al. |
| 2002/0015233 A1 | 2/2002 | Park |
| 2002/0021498 A1 | 2/2002 | Ohtaka |
| 2002/0080615 A1 | 6/2002 | Marshall et al. |
| 2002/0080622 A1 | 6/2002 | Pashley et al. |
| 2002/0097962 A1 | 7/2002 | Yoshimura et al. |
| 2002/0017615 A1 | 11/2002 | Matsushita et al. |
| 2002/0176153 A1 | 11/2002 | Matsushita et al. |
| 2002/0176173 A1 | 11/2002 | Song |
| 2002/0186179 A1 | 12/2002 | Knowles |
| 2002/0191297 A1 | 12/2002 | Gleckman et al. |
| 2003/0004336 A1 | 1/2003 | Siviero et al. |
| 2003/0020006 A1 | 1/2003 | Janeczko et al. |
| 2003/0043364 A1 | 3/2003 | Jamieson et al. |
| 2003/0063042 A1 | 4/2003 | Friesem et al. |
| 2003/0165017 A1 | 9/2003 | Amitai |
| 2003/0197938 A1 | 10/2003 | Schmidt et al. |
| 2003/0218718 A1 | 11/2003 | Moliton et al. |
| 2003/0235768 A1 | 12/2003 | Fincher et al. |
| 2004/0032660 A1 | 2/2004 | Amitai |
| 2004/0033528 A1 | 2/2004 | Amitai |
| 2004/0080718 A1 | 4/2004 | Kojima |
| 2004/0130797 A1 | 7/2004 | Leigh Travis |
| 2004/0137189 A1 | 7/2004 | Tellini et al. |
| 2004/0145814 A1 | 7/2004 | Rogers |
| 2004/0165254 A1 | 8/2004 | Tokura |
| 2004/0263842 A1 | 12/2004 | Puppels et al. |
| 2004/0264185 A1 | 12/2004 | Grotsch et al. |
| 2005/0018308 A1 | 1/2005 | Cassarly et al. |
| 2005/0023545 A1 | 2/2005 | Camras et al. |
| 2005/0024849 A1 | 2/2005 | Parker et al. |
| 2005/0073577 A1 | 4/2005 | Sudo |
| 2005/0078388 A1 | 4/2005 | Amitai |
| 2005/0083592 A1 | 4/2005 | Amitai |
| 2005/0084210 A1 | 4/2005 | Cha |
| 2005/0173719 A1 | 8/2005 | Yonekubo et al. |
| 2005/0174658 A1 | 8/2005 | Long et al. |
| 2005/0180687 A1 | 8/2005 | Amitai |
| 2005/0225866 A1 | 10/2005 | Abu Ageel |
| 2005/0248852 A1 | 11/2005 | Yamasaki |
| 2006/0012842 A1 | 1/2006 | Abu-Ageel |
| 2006/0052146 A1 | 3/2006 | Ou |
| 2006/0061555 A1 | 3/2006 | Mullen |
| 2006/0091784 A1 | 5/2006 | Conner et al. |
| 2006/0103590 A1 | 5/2006 | Divon |
| 2006/0146518 A1 | 7/2006 | Dubin |
| 2006/0151379 A1 | 7/2006 | Fobe et al. |
| 2006/0153518 A1 | 7/2006 | Abu AGeel et al. |
| 2006/0228073 A1 | 10/2006 | Mukawa |
| 2006/0268421 A1 | 11/2006 | Shimizu et al. |
| 2007/0002191 A1 | 1/2007 | Hashizume et al. |
| 2007/0003570 A1 | 2/2007 | Margulis |
| 2007/0035706 A1 | 2/2007 | Margulis |
| 2007/0052929 A1 | 3/2007 | Allman et al. |
| 2007/0070859 A1 | 3/2007 | Hirayama |
| 2007/0091445 A1 | 4/2007 | Amitai |
| 2007/0097513 A1 | 5/2007 | Amitai |
| 2007/0153344 A1 | 7/2007 | Lin |
| 2007/0155277 A1 | 7/2007 | Amitai |
| 2007/0159673 A1 | 7/2007 | Freeman et al. |
| 2007/0165192 A1 | 7/2007 | Prior |
| 2007/0284565 A1 | 12/2007 | Leatherdale et al. |
| 2007/0285663 A1 | 12/2007 | Hewitt et al. |
| 2007/0291491 A1 | 12/2007 | Li et al. |
| 2008/0019010 A1 | 1/2008 | Govorkov et al. |
| 2008/0025667 A1 | 1/2008 | Amitai |
| 2008/0030974 A1 | 2/2008 | Abu-Ageel |
| 2008/0062686 A1 | 3/2008 | Hoelen et al. |
| 2008/0068852 A1 | 3/2008 | Goihl |
| 2008/0106775 A1 | 5/2008 | Amitai et al. |
| 2008/0151375 A1 | 6/2008 | Lin |
| 2008/0186604 A1 | 8/2008 | Amitai |
| 2008/0192239 A1 | 8/2008 | Otosaka |
| 2008/0198471 A1 | 8/2008 | Amitai |
| 2008/0198604 A1 | 8/2008 | Kim et al. |
| 2008/0259429 A1 | 10/2008 | Kamm |
| 2008/0278812 A1 | 11/2008 | Amitai |
| 2008/0285140 A1 | 11/2008 | Amitai |
| 2008/0316606 A1 | 12/2008 | Inoguchi et al. |
| 2009/0010023 A1 | 1/2009 | Kanade et al. |
| 2009/0052046 A1 | 2/2009 | Amitai |
| 2009/0052047 A1 | 2/2009 | Amitai |
| 2009/0059380 A1 | 3/2009 | Moliton |
| 2009/0097127 A1 | 4/2009 | Amitai |
| 2009/0122414 A1 | 5/2009 | Amitai |
| 2009/0153437 A1 | 6/2009 | Aharoni |
| 2009/0165017 A1 | 6/2009 | Syed et al. |
| 2009/0275157 A1 | 11/2009 | Winberg et al. |
| 2010/0002029 A1 | 1/2010 | Takatsuka |
| 2010/0002465 A1 | 1/2010 | Tsang et al. |
| 2010/0020291 A1 | 1/2010 | Kasazumi et al. |
| 2010/0027289 A1 | 2/2010 | Aiki et al. |
| 2010/0046234 A1 | 2/2010 | Abu-Ageel |
| 2010/0053148 A1 | 3/2010 | Khazeni et al. |
| 2010/0171680 A1 | 7/2010 | Lapidot et al. |
| 2010/0201953 A1 | 8/2010 | Freeman et al. |
| 2010/0202048 A1 | 8/2010 | Amitai et al. |
| 2010/0202128 A1 | 8/2010 | Saccomanno |
| 2010/0202129 A1 | 8/2010 | Abu-Ageel |
| 2010/0214635 A1 | 8/2010 | Sasaki et al. |
| 2010/0278480 A1 | 11/2010 | Vasylyev et al. |
| 2010/0290124 A1 | 11/2010 | Tohara |
| 2010/0291489 A1 | 11/2010 | Moskovits et al. |
| 2010/0302276 A1 | 12/2010 | Levola |
| 2011/0007243 A1 | 1/2011 | Tanaka |
| 2011/0013245 A1 | 1/2011 | Tanaka |
| 2011/0050595 A1 | 3/2011 | Lunback et al. |
| 2011/0096566 A1 | 4/2011 | Tsai et al. |
| 2011/0176218 A1 | 7/2011 | Noui |
| 2011/0228511 A1 | 9/2011 | Weber |
| 2011/0242661 A1 | 10/2011 | Simmonds |
| 2012/0039072 A1 | 2/2012 | Lell et al. |
| 2012/0062998 A1 | 3/2012 | Schultz |
| 2012/0069547 A1 | 3/2012 | Gielen et al. |
| 2012/0179369 A1 | 6/2012 | Lapidot et al. |
| 2012/0194781 A1 | 8/2012 | Agurok |
| 2012/0274751 A1 | 11/2012 | Smith et al. |
| 2012/0281389 A1 | 11/2012 | Panagotacos et al. |
| 2012/0287621 A1 | 11/2012 | Lee et al. |
| 2013/0016292 A1 | 1/2013 | Miao et al. |
| 2013/0016413 A1* | 1/2013 | Saeedi ............... G02B 27/01 359/205.1 |
| 2013/0022316 A1 | 1/2013 | Pelletier et al. |
| 2013/0038933 A1 | 2/2013 | Wang |
| 2013/0120986 A1 | 5/2013 | Xi |
| 2013/0135749 A1 | 5/2013 | Akutsu et al. |
| 2013/0187836 A1 | 7/2013 | Cheng |
| 2013/0201690 A1 | 8/2013 | Vissenberg et al. |
| 2013/0208498 A1 | 8/2013 | Ouderkirk |
| 2013/0215361 A1 | 8/2013 | Wang |
| 2013/0229717 A1 | 9/2013 | Amitai |
| 2013/0250430 A1 | 9/2013 | Robbins et al. |
| 2013/0257832 A1 | 10/2013 | Hammond |
| 2013/0276960 A1 | 10/2013 | Amitai |
| 2013/0279017 A1 | 10/2013 | Amitai |
| 2013/0334504 A1 | 12/2013 | Thompson et al. |
| 2014/0003762 A1 | 1/2014 | Macnamara |
| 2014/0004961 A1 | 1/2014 | Brunet De Courssou et al. |
| 2014/0016051 A1 | 1/2014 | Kroll |
| 2014/0049610 A1 | 2/2014 | Hudman et al. |
| 2014/0104665 A1 | 4/2014 | Popovitch |
| 2014/0104852 A1 | 4/2014 | Duong et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |

(56) References Cited

U.S. PATENT DOCUMENTS

| | | |
|---|---|---|
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0140654 A1 | 5/2014 | Brown et al. |
| 2014/0192539 A1 | 7/2014 | Yriberri et al. |
| 2014/0226215 A1 | 8/2014 | Komatsu |
| 2014/0226361 A1 | 8/2014 | Vasylyev |
| 2014/0264420 A1 | 9/2014 | Edwards et al. |
| 2014/0293434 A1 | 10/2014 | Cheng |
| 2014/0300966 A1* | 10/2014 | Travers ............... G02B 6/0035 359/558 |
| 2014/0334126 A1 | 11/2014 | Speier et al. |
| 2014/0334777 A1 | 11/2014 | Dubroca et al. |
| 2014/0374377 A1 | 12/2014 | Schulz |
| 2015/0009682 A1 | 1/2015 | Clough |
| 2015/0009687 A1 | 1/2015 | Lin |
| 2015/0016777 A1 | 1/2015 | Abovitz et al. |
| 2015/0049486 A1 | 2/2015 | Jung et al. |
| 2015/0081313 A1 | 3/2015 | Boross et al. |
| 2015/0098206 A1 | 4/2015 | Pickard et al. |
| 2015/0103306 A1 | 4/2015 | Kaji et al. |
| 2015/0131059 A1 | 5/2015 | Fischer et al. |
| 2015/0138451 A1 | 5/2015 | Amitai |
| 2015/0153569 A1 | 6/2015 | Yonekubo |
| 2015/0182348 A1 | 7/2015 | Siegal et al. |
| 2015/0185475 A1 | 7/2015 | Saarikko et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0207990 A1 | 7/2015 | Ford |
| 2015/0219834 A1 | 8/2015 | Nichol et al. |
| 2015/0247617 A1 | 9/2015 | Du et al. |
| 2015/0260992 A1 | 9/2015 | Luttmann et al. |
| 2015/0277127 A1 | 10/2015 | Amitai |
| 2015/0293360 A1 | 10/2015 | Amitai |
| 2015/0355481 A1 | 12/2015 | Hilkes et al. |
| 2016/0041387 A1 | 2/2016 | Valera et al. |
| 2016/0062119 A1 | 3/2016 | Fitch et al. |
| 2016/0109712 A1 | 4/2016 | Harrison et al. |
| 2016/0116743 A1 | 4/2016 | Amitai |
| 2016/0161740 A1 | 6/2016 | Bar-Zeev et al. |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0189432 A1 | 6/2016 | Bar-Zeev et al. |
| 2016/0202048 A1 | 7/2016 | Meng |
| 2016/0209648 A1 | 7/2016 | Haddick et al. |
| 2016/0209657 A1 | 7/2016 | Popovich et al. |
| 2016/0215956 A1 | 7/2016 | Smith et al. |
| 2016/0234485 A1 | 8/2016 | Robbins et al. |
| 2016/0266387 A1 | 9/2016 | Tekolste et al. |
| 2016/0313567 A1 | 10/2016 | Kurashige |
| 2016/0327906 A1 | 11/2016 | Futterer |
| 2016/0341964 A1 | 11/2016 | Amitai |
| 2016/0349518 A1 | 12/2016 | Amitai et al. |
| 2016/0370534 A1 | 12/2016 | Liu et al. |
| 2017/0003504 A1 | 1/2017 | Vallius |
| 2017/0011555 A1 | 1/2017 | Li et al. |
| 2017/0017095 A1 | 1/2017 | Fricker et al. |
| 2017/0045666 A1 | 2/2017 | Vasylyev |
| 2017/0045744 A1 | 2/2017 | Amitai |
| 2017/0052376 A1 | 2/2017 | Amitai |
| 2017/0052377 A1 | 2/2017 | Amitai |
| 2017/0122725 A1 | 5/2017 | Yeoh |
| 2017/0176755 A1 | 6/2017 | Cai |
| 2017/0276947 A1 | 9/2017 | Yokoyama |
| 2017/0299860 A1* | 10/2017 | Wall ........................ G02B 3/04 |
| 2017/0336636 A1 | 11/2017 | Amitai et al. |
| 2017/0343822 A1 | 11/2017 | Border et al. |
| 2017/0353714 A1 | 12/2017 | Poulad et al. |
| 2017/0357095 A1 | 12/2017 | Amitai |
| 2017/0363799 A1 | 12/2017 | Ofir et al. |
| 2018/0003862 A1 | 1/2018 | Benitez |
| 2018/0039082 A1 | 2/2018 | Amitai |
| 2018/0067315 A1 | 3/2018 | Amitai et al. |
| 2018/0097335 A1 | 4/2018 | Breidenassel et al. |
| 2018/0101087 A1 | 4/2018 | Shinohara |
| 2018/0120559 A1 | 5/2018 | Yeoh et al. |
| 2018/0157057 A1 | 6/2018 | Gelberg et al. |
| 2018/0210202 A1 | 7/2018 | Danziger |
| 2018/0267295 A1 | 9/2018 | Dalrymple et al. |
| 2018/0267317 A1 | 9/2018 | Amitai |
| 2018/0275384 A1 | 9/2018 | Danziger et al. |
| 2018/0284440 A1* | 10/2018 | Popovich ........... G02B 27/0172 |
| 2018/0292592 A1 | 10/2018 | Danziger |
| 2018/0292599 A1 | 10/2018 | Ofir et al. |
| 2018/0307014 A1 | 10/2018 | Tanaka |
| 2018/0322845 A1* | 11/2018 | Machida ............... G02F 1/1523 |
| 2018/0372940 A1 | 12/2018 | Ishii et al. |
| 2018/0373039 A1 | 12/2018 | Amitai |
| 2019/0005660 A1 | 1/2019 | Kinoshita et al. |
| 2019/0011710 A1 | 1/2019 | Amitai |
| 2019/0020858 A1 | 1/2019 | Pappas et al. |
| 2019/0056600 A1 | 2/2019 | Danziger et al. |
| 2019/0064518 A1 | 2/2019 | Danziger |
| 2019/0121137 A1 | 4/2019 | Dykaar |
| 2019/0129175 A1 | 5/2019 | Amitai et al. |
| 2019/0137777 A1* | 5/2019 | Yang .................. G02B 27/4272 |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0227317 A1 | 7/2019 | Trail et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377122 A1 | 12/2019 | Danziger |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278547 A1 | 9/2020 | Singer |
| 2020/0278557 A1 | 9/2020 | Greenstein et al. |
| 2020/0278558 A1 | 9/2020 | Yamamoto et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292818 A1 | 9/2020 | Amitai et al. |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0080638 A1 | 3/2021 | Nichol et al. |
| 2021/0099691 A1 | 4/2021 | Danziger |
| 2021/0109351 A1 | 4/2021 | Danziger et al. |

(56) References Cited

U.S. PATENT DOCUMENTS

| | | |
|---|---|---|
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |
| 2021/0239898 A1 | 8/2021 | Danziger et al. |
| 2021/0271006 A1 | 9/2021 | Ronen et al. |
| 2022/0003914 A1 | 1/2022 | Danziger et al. |
| 2022/0004001 A1 | 1/2022 | Danziger et al. |
| 2022/0004014 A1 | 1/2022 | Ronen et al. |
| 2022/0019018 A1 | 1/2022 | Gilo et al. |
| 2022/0030205 A1 | 1/2022 | Danziger |
| 2022/0043272 A1 | 2/2022 | Amitai |
| 2022/0057643 A1 | 2/2022 | Eisenfeld et al. |
| 2022/0075194 A1 | 3/2022 | Ronen et al. |
| 2022/0043269 A1 | 10/2022 | Maziel |

FOREIGN PATENT DOCUMENTS

| | | | |
|---|---|---|---|
| CN | 101542346 | 9/2009 | |
| CN | 101846799 | 9/2010 | |
| CN | 101846799 A | 9/2010 | |
| CN | 103837988 | 6/2014 | |
| DE | 1422172 | 11/1970 | |
| DE | 19725262 | 12/1998 | |
| DE | 102013106392 | 12/2014 | |
| DE | 10-2018 10296 | 8/2019 | |
| EP | 0365406 | 4/1990 | |
| EP | 0380035 | 8/1990 | |
| EP | 0543718 | 5/1993 | |
| EP | 0566004 | 10/1993 | |
| EP | 0580952 | 2/1994 | |
| EP | 1158336 | 11/2001 | |
| EP | 1180711 | 2/2002 | |
| EP | 1326102 | 7/2003 | |
| EP | 0399865 | 1/2004 | |
| EP | 1385023 | 1/2004 | |
| EP | 1485747 | 12/2004 | |
| EP | 1562066 | 8/2005 | |
| EP | 1691547 | 8/2006 | |
| EP | 0770818 | 4/2007 | |
| EP | 1779159 | 5/2007 | |
| FR | 2496905 | 6/1982 | |
| FR | 2638242 | 4/1990 | |
| FR | 2721872 | 1/1996 | |
| GB | 1514977 | 6/1978 | |
| GB | 2220081 | 12/1989 | |
| GB | 2272980 | 6/1994 | |
| GB | 2278222 | 11/1994 | |
| GB | 2278888 | 12/1994 | |
| GB | 2495398 | 4/2013 | |
| IL | 183637 | 6/2013 | |
| JP | 04-159503 | 6/1992 | |
| JP | 9-258962 | 10/1997 | |
| JP | H09304036 A | 11/1997 | |
| JP | 2001021448 A | 7/1999 | |
| JP | 2002350771 | 12/2002 | |
| JP | 2002368762 | 12/2002 | |
| JP | 2003065739 | 3/2003 | |
| JP | 2003140081 | 5/2003 | |
| JP | 2003520984 | 7/2003 | |
| JP | 2004233909 | 8/2004 | |
| JP | 2006145644 | 6/2006 | |
| JP | 2008158446 | 12/2006 | |
| JP | 2010014705 | 1/2010 | |
| JP | 2012-058404 | 3/2012 | |
| JP | 2012123936 | 6/2012 | |
| JP | 2012-198263 | 10/2012 | |
| JP | 2016028275 | 2/2016 | |
| JP | 2018189906 | 11/2018 | |
| KR | 20120105286 A * | 9/2012 | ......... G03B 21/2053 |
| KR | 101470387 | 12/2014 | |
| TW | 201809798 | 3/2018 | |
| WO | 9314393 | 7/1993 | |
| WO | 9510106 | 4/1995 | |
| WO | 9815868 | 4/1998 | |
| WO | 9952002 | 10/1999 | |
| WO | 0004407 | 1/2000 | |
| WO | 0063738 | 10/2000 | |
| WO | 0195025 | 12/2001 | |
| WO | 0195027 | 12/2001 | |
| WO | 2082168 | 10/2002 | |
| WO | 03058320 | 7/2003 | |
| WO | 03081320 | 10/2003 | |
| WO | 2004109349 | 12/2004 | |
| WO | 2008023367 | 2/2008 | |
| WO | 2009066408 | 5/2009 | |
| WO | 2011130720 | 10/2011 | |
| WO | 2012008966 | 1/2012 | |
| WO | 2013065656 | 5/2013 | |
| WO | 2013112705 | 8/2013 | |
| WO | 2013188464 | 12/2013 | |
| WO | 2014076599 | 5/2014 | |
| WO | 2014155096 | 10/2014 | |
| WO | 2015081313 | 6/2015 | |
| WO | 2016/017085 | 2/2016 | |
| WO | 2016103251 | 6/2016 | |
| WO | 2016/181459 | 11/2016 | |
| WO | 2017106873 | 6/2017 | |
| WO | 2019/149352 | 1/2018 | |
| WO | 2018138714 | 8/2018 | |
| WO | 2019/149352 | 8/2019 | |
| WO | 2019154465 | 8/2019 | |
| WO | 2021260708 | 2/2022 | |

OTHER PUBLICATIONS

Petros L.Stavroulakis et al : "Suppression iof backsacattered diffraction from sub-wavelength 'moth-eye arrays'"; published in Optics Express Jan. 2013.

Jan Van De Kraats; et al "Directional and Non-Directional Spectral reflection from the Human Fovea"; Journal of Biomedial Optics vol. (13)/2.

International Commission on Non-Ionizing Iradiation Protection : "NCIRP Guidelines for limiting Exposure to Time-Varying Electric, Magnetic and Electromagnetic Fields"; Published in Health Physics, Apr. 1998 vol. 74 No. 4.

R.J Wiblein et al ;"Optimized Anti-Reflective structures for As_2s_3 Chalcogenide Optical Fibers", published in Optics Express , May 2, 2016 vol. 24 No. 9.

O.Yang et al;"Antireflection Effects at NanoStructures Materials Interfaces and teh Suppression of Thin-Film Intereference";published in Nanotechnology 24 (2013).

International Commission on Non-Ionizing Radiation Protection "ICNIRP Guidelines for Limiting Exposure to Time-Varying Electric, Magnetic and Electromagnetic Fields (Up To 300 GHZ)" Published In: Health Physics 74 (4):494-522: 1998.

Jan van de Kraats et al. "Directional and nondirectional spectral reflection from the human fovea" journal of biomedical optics 13(2), 024010 (Mar./ Apr. 2008.

Jinying Li et al "Improvement of pointing accuracy for Risley prisms by parameter identification", Sep. 2017Applied Optics 56(26):7358; DOI:10.1364/AO.56.007358.

Klaus Ehrmann et al "Optical power mapping using paraxial laser scanning",Proceedings vol. 7163, Ophthalmic Technologies XIX; 71631E (2009) https://doi.org/10.1117/12.806765 Event: SPIE BIOS, 2009, San Jose, California, United States.

Erhui Qi et al "The Application of Pentaprism Scanning Technology on the Manufacturing of M3MP",Proc. of SPIE vol. 9682 96821A-1 Downloaded From: http://proceedings.spiedigitallibrary.org/ on Dec. 8, 2016 Terms of Use: http://spiedigitallibrary.org/ss/termsofuse.aspx.

Wei Chen et al"An Image Quality Evaluation Method of near-eye display", First published: May 25, 2016 https://doi.org/10.1002/sdtp.10935.

* cited by examiner

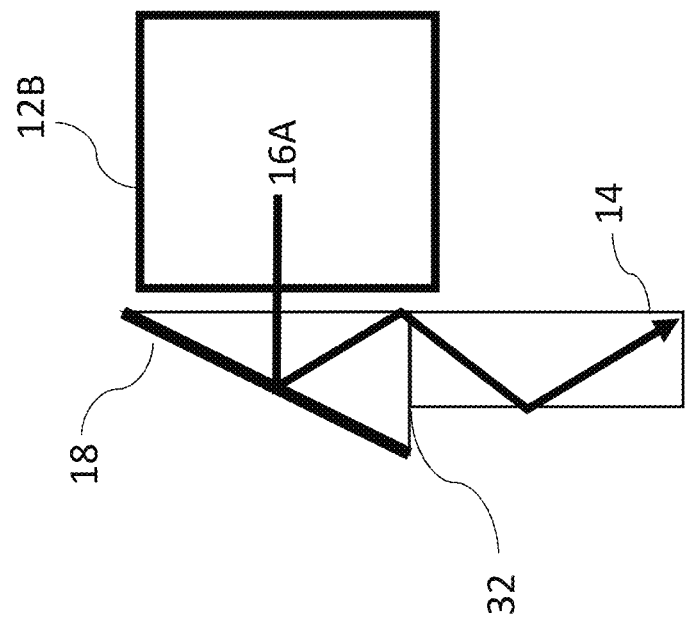
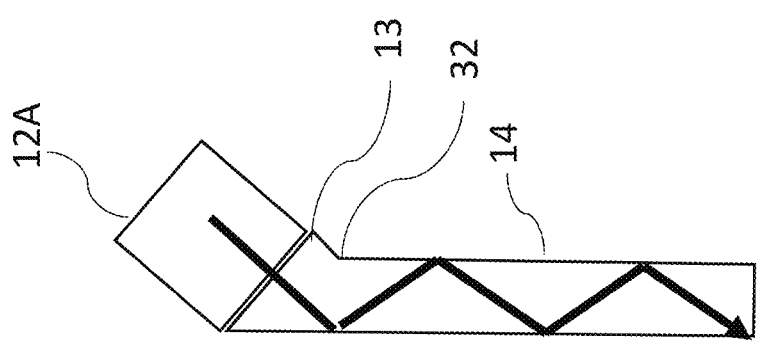

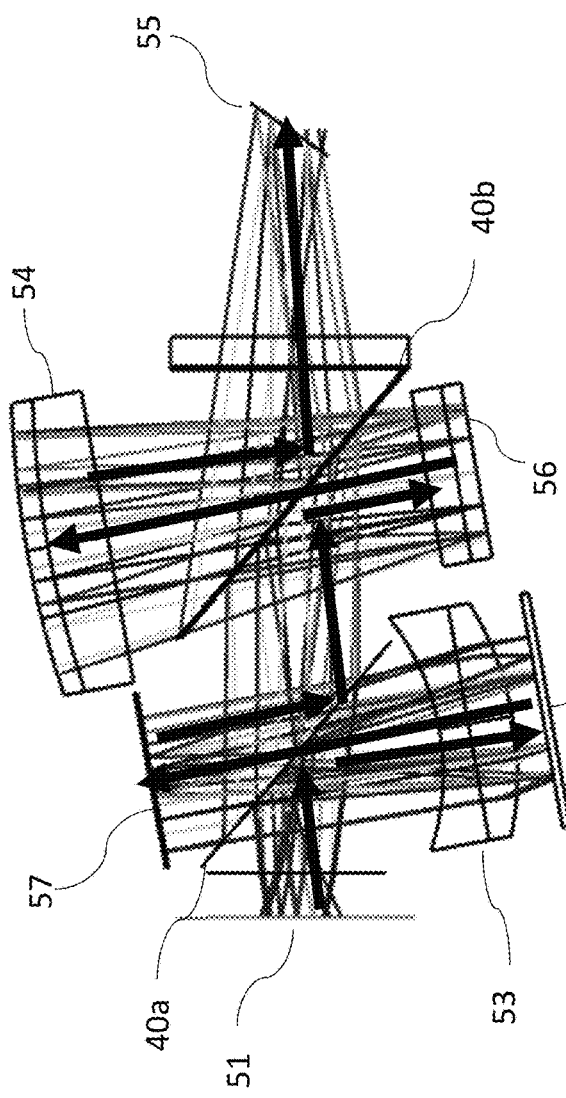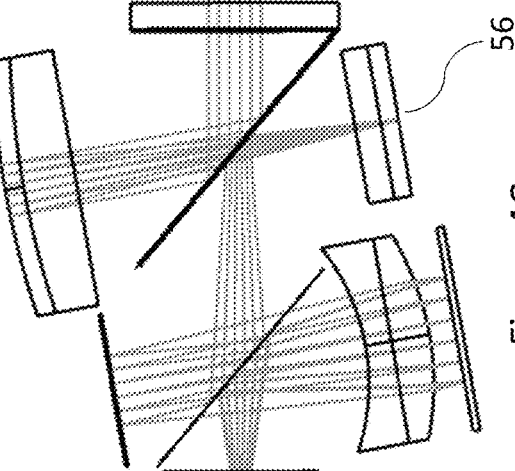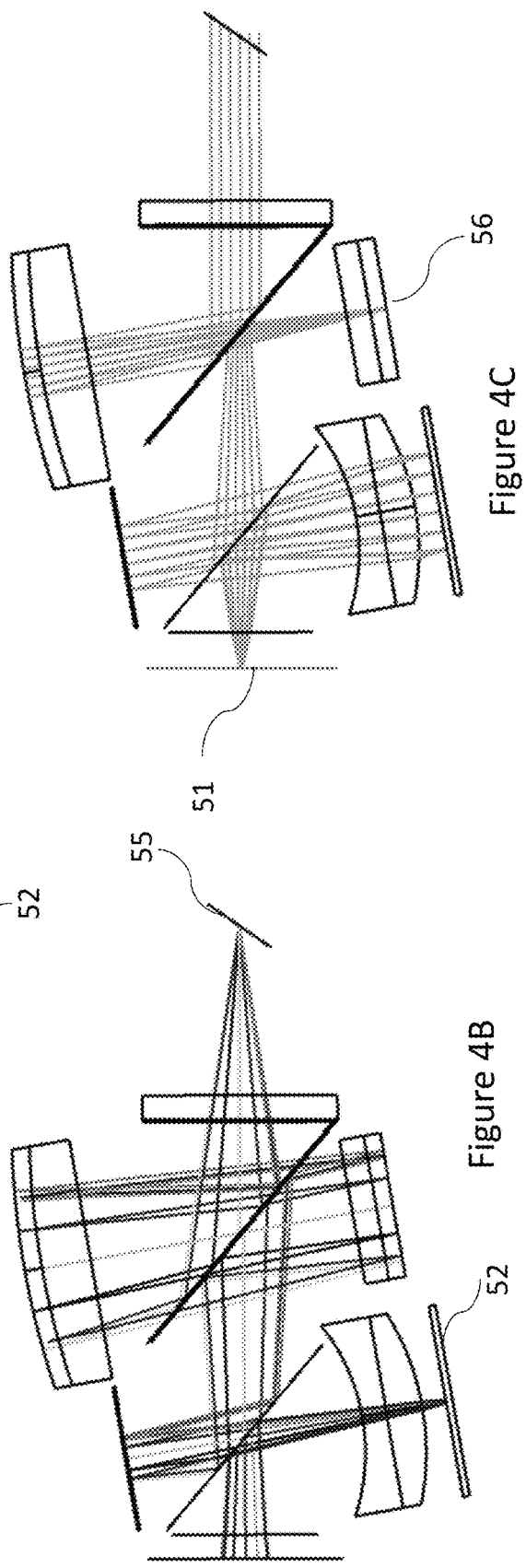
Figure 4A
Figure 4C
Figure 4B

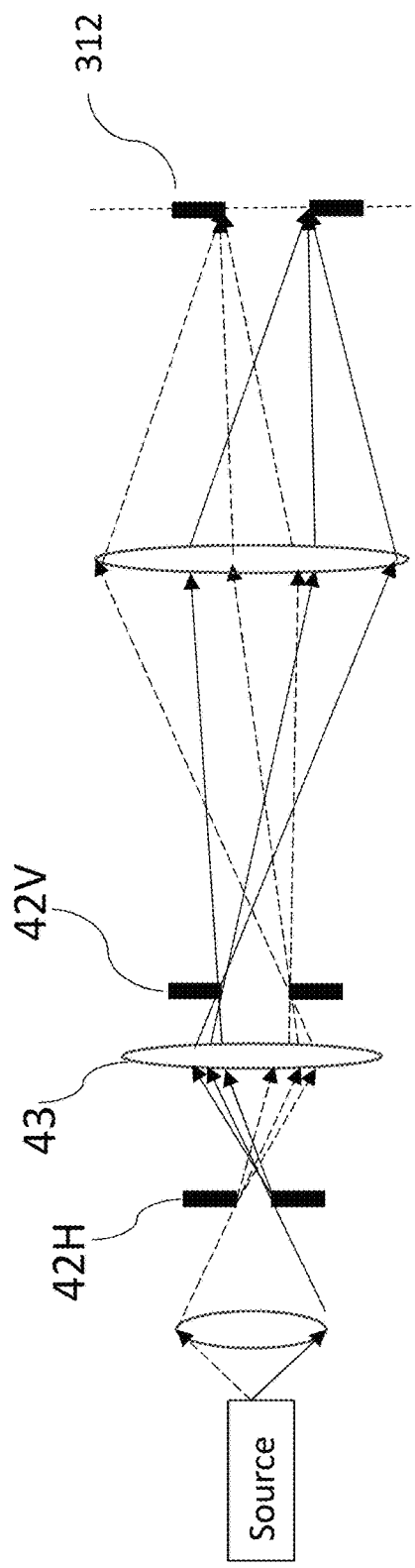
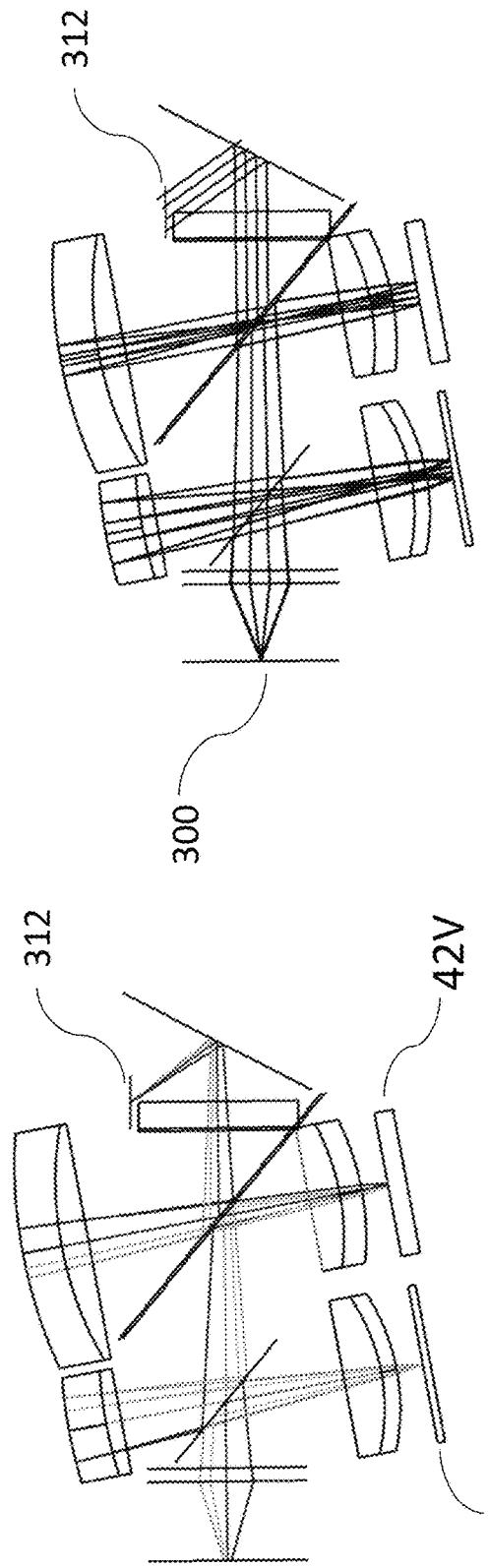
Figure 7D
Figure 7E
Figure 7F

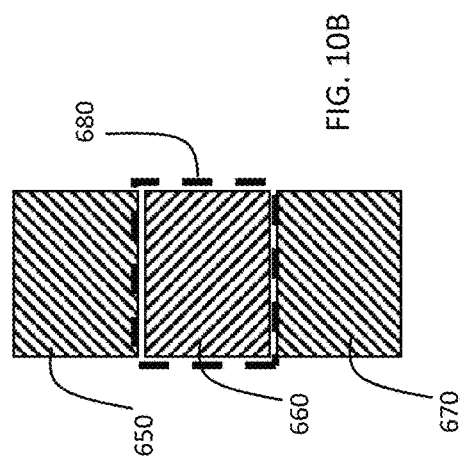
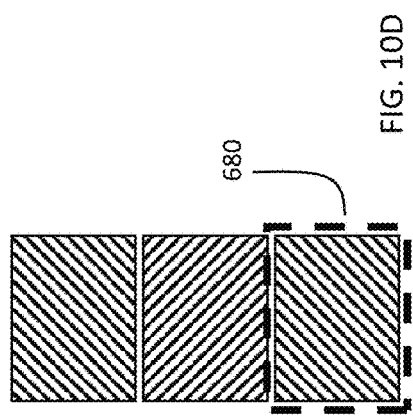
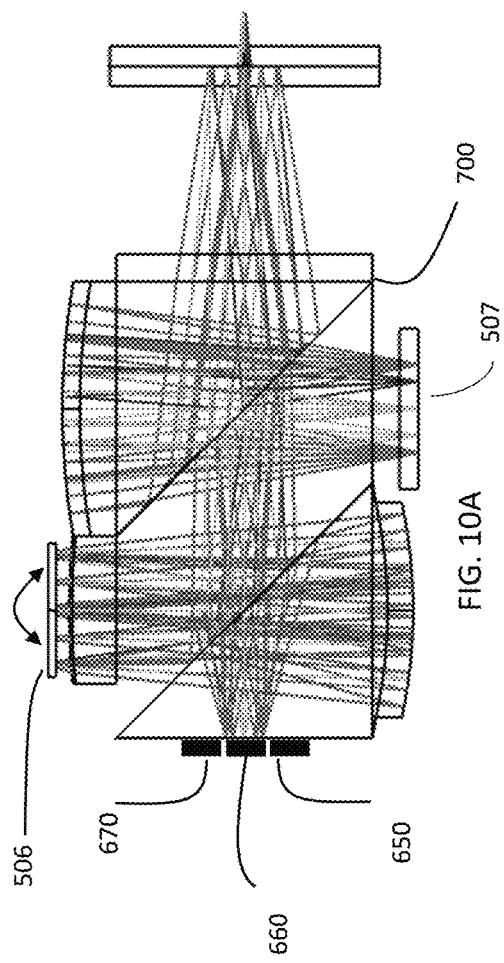
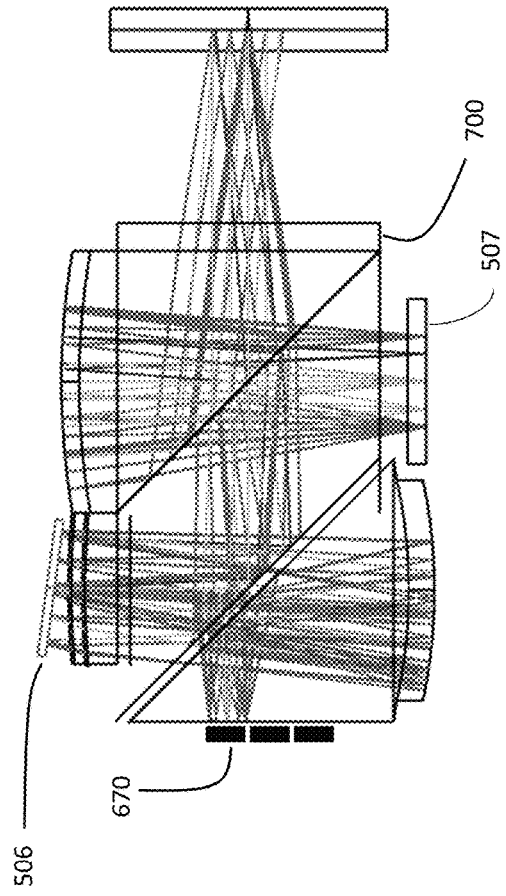

IMAGE PROJECTOR

FIELD AND BACKGROUND OF THE INVENTION

The present invention relates to image projectors and, in particular, it concerns image projectors with various configurations for illuminating an entrance to a waveguide.

It is known to project an image by illuminating a spatial light modulator, such as a liquid crystal display (LCD), liquid crystal on silicon (LCOS) modulator or a digital micromirror device of a digital light processing (DLP) system, and collimating the modulated image for output to an eye of a user. Such projectors are often used in near eye displays, where the projected image is typically introduced into a light guide along which the image propagates by internal reflection until being coupled out to the eye of the user, typically by partially-reflective surfaces or by diffractive elements, which may contribute to expansion of the effective optical aperture from which the image is projected towards the eye.

Near eye displays typically include two major modules: a light-guide optical element ("LOE" or "waveguide") and an image projector, sometimes referred to as a "projecting optical device" or "POD". The entrance pupil into the waveguide dictates the exit pupil required from the projector. The exit pupil of the projector is therefore located at some distance forward from its optics. The optical coupling arrangement of light from the projector into the waveguide determines this distance.

FIG. 1A shows an existing diagonal approach where a projector 12A transmits image light through a prism 13 into a waveguide 14. In this configuration the optical distance between projector 12A and waveguide entrance pupil is relatively short.

FIG. 1B shows perpendicular approach to couple light into waveguide. In this figure projector 12B is shown to transmit the chief ray 16A. The light ray is reflected from mirror surface 18 at such angle that it is trapped by total internal reflection (TIR) within waveguide 14.

In both FIGS. 1A and 1B, a critical point (actually, an edge extending into the page of the drawing) 32 determines the entrance pupil into the waveguide, at least in the width dimension as illustrated. It is apparent that the optical path from the projector to this entrance pupil is shorter in FIG. 1A than in FIG. 1B.

The optical apertures of the waveguides are actually defined in two dimensions. In particularly preferred implementations, two dimensions of aperture expansion are performed between the projector exit pupil and the observer's eye. This may be achieved by using an independent waveguide for a first dimension of expansion, as exemplified by the waveguide of FIG. 2A (corresponding to FIG. 12 of PCT publication WO2018065975, which is hereby incorporated in its entirety by reference), where an entrance pupil to the waveguide 24 is defined by two edges 26 and 28. These edges are not necessarily on the same plane. FIG. 2B shows a "1D" or slab-type waveguide 30 performing 2D aperture expansion by use of two sets of included partially-reflecting surfaces. In this case, waveguide edges 34 determine the one side of the entrance pupil (marked area) while the edge on the other dimension 35 is not uniquely defined (schematically shown as arrow 36), allowing the entrance pupil in this dimension to vary along the waveguide plane.

SUMMARY OF THE INVENTION

The present invention is an image projector.

According to the teachings of an embodiment of the present invention there is provided, an image projector for projecting a collimated image via an exit stop for injection into an input stop of a light-guide optical element, the collimated image being a representation of a digital image with a field of view, the image projector comprising: (a) an illumination arrangement comprising a plurality of illumination sources; (b) a tilt-mirror assembly comprising a mirror and a driver for driving tilt motion of the mirror; (c) a controller in electronic connection with the driver and the illumination arrangement; and (d) an optical arrangement comprising a plurality of optical elements deployed to: (i) direct illumination from the plurality of illumination sources towards the mirror; (ii) direct the illumination reflected from the mirror towards an image plane; and (iii) collimate illumination from the image plane to generate a collimated image directed to the exit stop, wherein the controller modulates an intensity of each of the illumination sources synchronously with the tilt motion of the mirror according to the content of the digital image, and wherein the plurality of illumination sources are spaced apart and the tilt motion is such that illumination from each of the illumination sources scans across only part of one dimension of the field of view while illumination from the plurality of illumination sources together scans across the entirety of the one dimension.

According to a further feature of an embodiment of the present invention, the optical arrangement substantially images the mirror to the exit stop.

According to a further feature of an embodiment of the present invention, the tilt-mirror assembly is part of a two-axis scanning arrangement such that illumination from each of the illumination sources scans across the image plane in a two-dimensional scanning pattern.

According to a further feature of an embodiment of the present invention, the spaced-apart illumination sources are part of a two dimensional array of illumination sources spaced apart in two dimensions, and wherein the two-dimensional scanning pattern is such that illumination from each of the illumination sources scans across only part of each dimension of the field of view while illumination from the plurality of illumination together scans across the entirety of both dimensions of the field of view.

According to a further feature of an embodiment of the present invention, each of the spaced-apart illumination sources is part of a group of illumination sources that cooperate to generate a substantially continuous illumination pattern spanning a dimension of the field of view perpendicular to a scanning-direction dimension of the field of view.

According to a further feature of an embodiment of the present invention, the optical arrangement is configured to focus the illumination reflected from the mirror at the image plane such that each of the illumination sources generates an instantaneous spot at the image plane corresponding to a single pixel of the digital image.

According to a further feature of an embodiment of the present invention, there is also provided a spatial light modulator deployed at the image plane, and wherein the optical arrangement is configured to generate a patch of illumination from each of the illumination sources illuminating a plurality of pixel elements of the spatial light modulator, the spatial light modulator being driven by the controller in coordination with the illumination arrangement to generate a reproduction of the digital image.

According to a further feature of an embodiment of the present invention, all of the plurality of illumination sources are of a single color, and wherein each of the plurality of illumination sources is associated with two additional illumination sources of different colors, making up a triplet of red, green and blue colored illumination sources.

There is also provided according to the teachings of an embodiment of the present invention, an image projector for projecting a collimated image via an exit stop for injection into an input stop of a light-guide optical element, the collimated image being a representation of a digital image with a field of view, the image projector comprising: (a) an illumination arrangement comprising a plurality of illumination sources; (b) a tilt-mirror assembly comprising a mirror and a driver for driving tilt motion of the mirror; (c) a spatial light modulator having individually controlled pixel elements; (d) a controller in electronic connection with the spatial light modulator, the driver and the illumination arrangement; and (e) an optical arrangement comprising a plurality of optical elements deployed to: (i) direct illumination from the plurality of illumination sources towards the mirror; (ii) direct the illumination reflected from the mirror towards the spatial light modulator such that illumination from each of the illumination sources generates a patch of illumination illuminating a plurality of the pixel elements of the spatial light modulator; and (iii) collimate illumination from the spatial light modulator to generate a collimated image directed to the exit stop, wherein the controller drives the spatial light modulator in coordination with modulation of an intensity of each of the illumination sources synchronously with the tilt motion of the mirror to generate a reproduction of the digital image, and wherein the plurality of illumination sources comprises at least one group of individually controlled illumination sources generating a substantially continuous illumination pattern spanning at least part of a dimension of the field of view perpendicular to a primary scanning-direction dimension of the field of view.

According to a further feature of an embodiment of the present invention, the group of individually controlled illumination sources generates a substantially continuous illumination pattern spanning an entirety of a dimension of the field of view perpendicular to the primary scanning-direction dimension of the field of view.

There is also provided according to an embodiment of the present invention, an image projector for projecting a collimated image via an exit stop for injection into an input stop of a light-guide optical element, the collimated image being a representation of a digital image with a field of view, the image projector comprising: (a) an illumination arrangement comprising a plurality of illumination sources of different colors; (b) a tilt-mirror assembly comprising a mirror and a driver for driving tilt motion of the mirror between a plurality of positions; (c) a spatial light modulator having individually controlled pixel elements; (d) a controller in electronic connection with the spatial light modulator and the driver; and (e) an optical arrangement comprising a plurality of optical elements, the optical arrangement being configured to: (i) direct illumination from the plurality of illumination sources towards the mirror; (ii) direct the illumination reflected from the mirror towards the spatial light modulator such that illumination from one of the illumination sources illuminates the spatial light modulator; and (iii) collimate illumination from the spatial light modulator to generate a collimated image directed to the exit stop, wherein the controller drives the driver to displace the mirror between a first of the positions, in which the spatial light modulator is fully illuminated by a first of the illumination sources, and a second of the positions, in which the spatial light modulator is fully illuminated by a second of the illumination sources, thereby switching between colors of illumination, the controller actuating the spatial light modulator synchronously with switching between colors of illumination to generate corresponding content of the digital image for each of the colors of illumination.

According to a further feature of an embodiment of the present invention, in each of the positions of the mirror, the optical arrangement is configured to focus an image of one of the illumination sources onto the spatial light modulator.

There is also provided according to an embodiment of the present invention, an image projector for projecting a collimated image via an exit stop for injection into an input stop of a light-guide optical element, the collimated image being a representation of a digital image with a field of view, the image projector comprising: (a) an illumination arrangement comprising at least one illumination source; (b) a first tilt-mirror assembly comprising a first mirror and a first driver for driving tilt motion of the first mirror about a first tilt axis; (c) a second tilt-mirror assembly comprising a second mirror and a second driver for driving tilt motion of the second mirror about a second tilt axis; (d) a controller in electronic connection with the first and second drivers and with the illumination arrangement; and (e) an optical arrangement comprising a plurality of optical elements deployed to: (i) direct illumination from the at least one illumination source towards the first mirror; (ii) direct the illumination reflected from the mirror towards the second mirror; and (iii) collimate illumination from the second mirror to generate a collimated image directed to the exit stop, wherein the controller modulates an intensity of the at least one illumination source synchronously with the tilt motion of the first and second mirrors according to the content of the digital image, and wherein the optical arrangement is configured such that both the first mirror and the second mirror are located substantially in planes containing an image of the exit stop of the image projector.

According to a further feature of an embodiment of the present invention, the at least one illumination source is implemented as a plurality of spaced-apart illumination sources, and wherein the tilt motion of one of the first and second mirrors is such that illumination from each of the illumination sources scans across only part of one dimension of the field of view while illumination from the plurality of illumination sources together scans across the entirety of the one dimension.

According to a further feature of an embodiment of the present invention, the spaced-apart illumination sources are part of a two dimensional array of illumination sources spaced apart in two dimensions, and wherein the tilt motion of each of the first and second mirrors is such that illumination from each of the illumination sources scans across only part of each dimension of the field of view while illumination from the plurality of illumination together scans across the entirety of both dimensions of the field of view.

BRIEF DESCRIPTION OF THE DRAWINGS

The invention is herein described, by way of example only, with reference to the accompanying drawings, wherein:

FIGS. 1A and 1B, discussed above, are schematic side views of an image projector optically coupled to a light-guide optical element according to two conventional approaches;

FIGS. 4A-4C are schematic side views of a first optical arrangement for implementing an image projector, constructed and operative according to an embodiment of the present invention, illustrating different subsets of the ray paths through the arrangement;

FIGS. 7D-7F are schematic side views of a fifth optical arrangement for implementing an image projector, constructed and operative according to an embodiment of the present invention, employing two single-axis tilt-mirror assemblies, both located at different planes in which the exit pupil is reimaged, illustrating different subsets of the ray paths through the arrangement;

FIG. 10A is a schematic side view of an optical arrangement for implementing a projector in which a scanning arrangement is used for switching between illumination sources;

FIG. 10B is a schematic representation of a footprint of a spatial light modulator on the plurality of illumination sources, selecting a central LED;

FIGS. 10C and 10D are views similar to FIGS. 10A and 10B, respectively, illustrating selection of an alternative LED;

DESCRIPTION OF THE PREFERRED EMBODIMENTS

The present invention is an image projector.

The principles and operation of image projectors according to the present invention may be better understood with reference to the drawings and the accompanying description.

By way of introduction, the present invention relates to image projectors with various arrangements employing a tilt-mirror assembly with an illumination system as part of the image generating subsystem. The subject matter described herein can be conceptually subdivided into a number of different aspects of the invention which each stands alone in its own right, but which are most preferably used to advantage in various combinations. All combinations of the various aspects of the invention discussed below should be considered within the scope of the invention, except where specifically indicated to be incompatible.

Figure 3A:
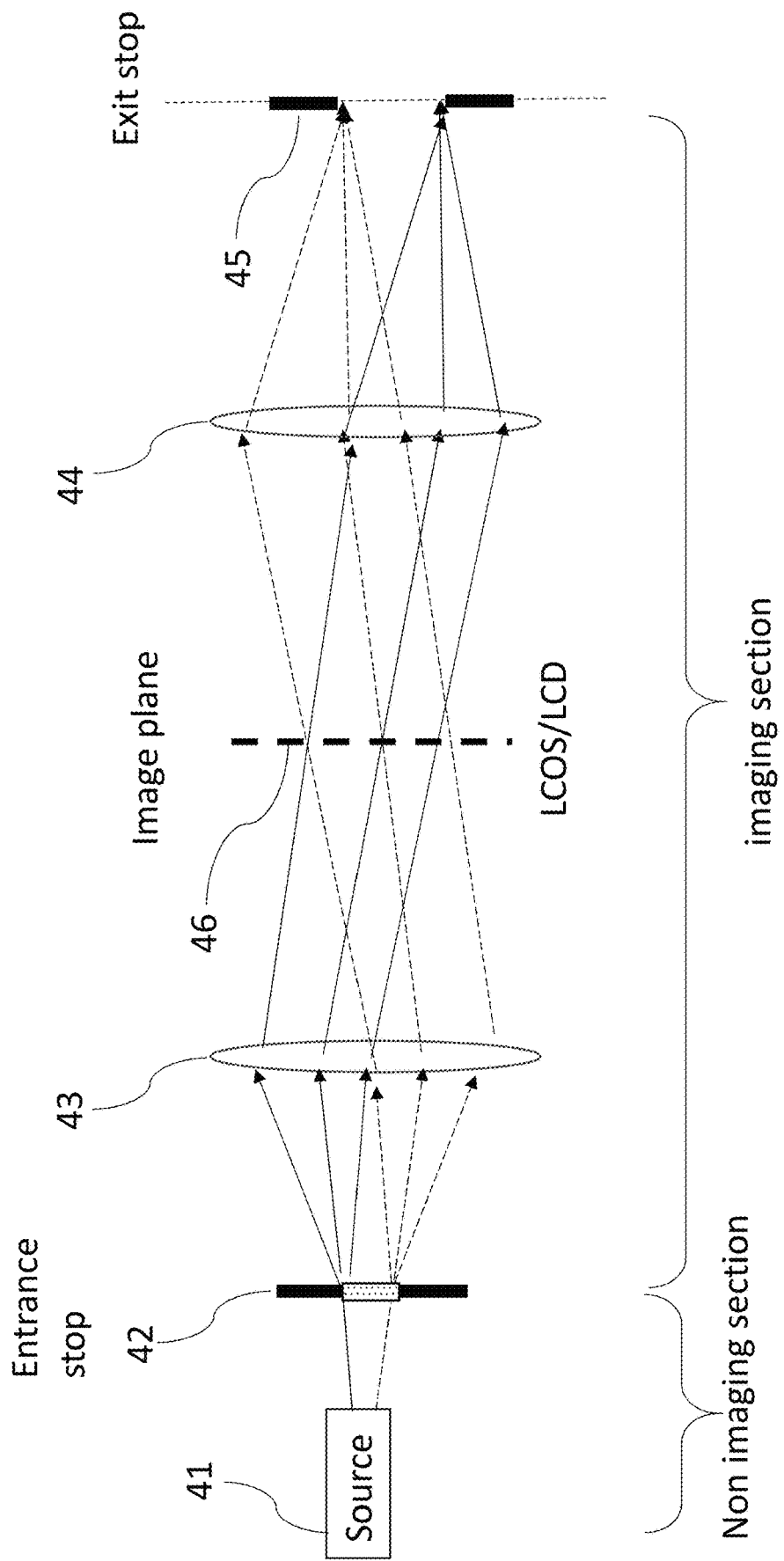
FIGS. 3A and 3B are two schematic representations of an image projector, constructed and operative according to the teachings of certain embodiments of the present invention.

Referring now to the drawings, FIG. 3A illustrates schematically an image projector according to a first aspect of the present invention, for projecting a collimated image via an exit stop 45. The image passes through an image plane 46 where, at least in certain embodiments, an image is generated by a spatial light modulator (SLM) providing a two dimensional array of pixel elements, each of the pixel elements being controllable to modulate a property, typically polarization, of light transmitted or reflected by the pixel element. An example of a transmitted light SLM is a liquid crystal display (LCD), while an example of a reflective SLM is a liquid crystal on silicon (LCOS) device or a digital light processing (DLP) device. The schematic representation here illustrates progression along an optical path from left to right, but it will be appreciated that this optical path can be folded at various reflective elements, including at LCOS 46, as will be exemplified in examples below. A collimating arrangement 44 of at least one optical element is configured to collimate illumination from the image plane (e.g., spatial light modulator) to generate a collimated image directed to exit stop 45, for injection into an input stop of a light-guide optical element (waveguide).

The image projector also includes an illumination arrangement delivering illumination from an illumination stop 42, and illumination optics 43 deployed in the optical path between illumination stop 42 and image plane 46. Preferably, in order to achieve high optical efficiency, illumination optics 43 and collimating arrangement 44 are configured such that an image of illumination stop 42 falls substantially on exit stop 45. This achieves "pupil imaging", ensuring that illumination rays directed from illumination stop 42 towards the SLM are efficiently directed towards the exit stop 45.

Light can be delivered to entrance stop 42 from any suitable light source 41, and can be concentrated by any suitable components, whether optical imaging components (lenses, mirrors) or non-imaging (light-pipe, diffusers) components. After illumination stop 42, only imaging optical components are used, so that "pupil-imaging" is achieved. Exit stop 45 is preferably the entrance into a light-guide optical element, such as those illustrated in FIGS. 1A, 1B, 2A and 2B, that relays the image to the observer (not shown). In a case of perfect pupil imaging, any light ray passing through stop 42 and falling on illumination optics 43 will reach exit stop 45 (subject to image modulation) and enter the waveguide, thereby achieving maximal illumination efficiency. Practically, much of the advantage of this aspect of the invention can be achieved by having the image of the illumination stop falling "substantially" on exit stop

45, taken here to mean that at least half of the rays exiting illumination stop 42 and reaching illumination optics 43, and more preferably at least 80 percent, fall on exit stop 45.

The image passing through exit stop 45 to an LOE must be collimated, i.e., where every point in the image is represented by a set of parallel rays that fill stop 45 uniformly. Image formation can be achieved using three main alternatives:

1. Scanning: The source 41 is a point source and the image is generated by using a scanning mirror at stop 42 to scan successive pixels, together with synchronized modulation of the illumination intensity according to the image information for each pixel of the image. In this case, no modulator is required at image plane 46.
2. Spatial modulation: A spatial light modulator is placed at the image plane 46, which corresponds to the focal plane of collimating arrangement 44. The modulator can be, for example, an LCOS, an LCD or a DLP device.
3. Combination: scanning at stop 42 with spatial modulation at plane 46.

Figure 3B:
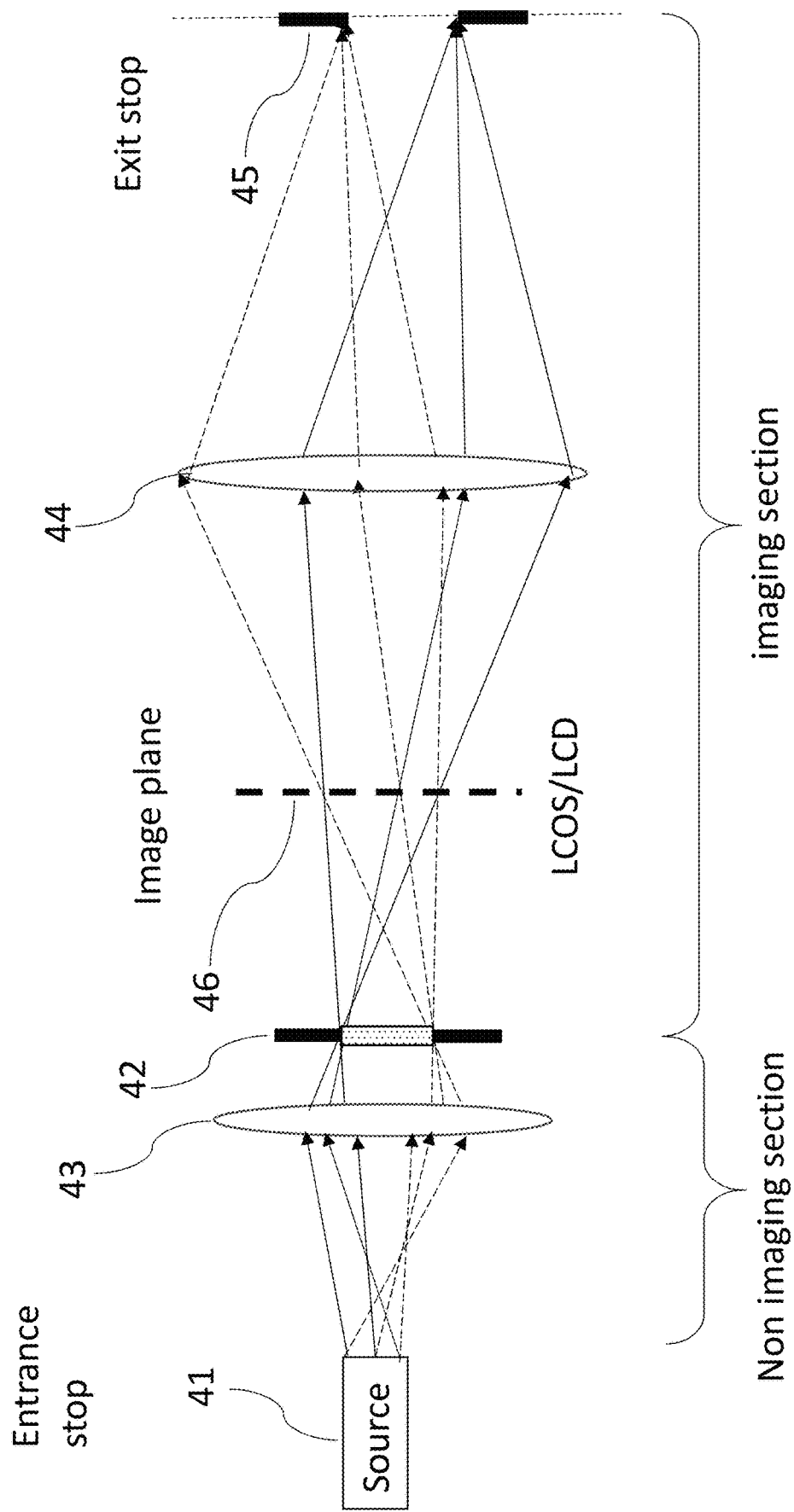

FIG. 3B shows architecture equivalent to FIG. 3A only with larger distance between exit pupil 45 and first lens 44, more suitable for implementing certain optical designs, such as the perpendicular coupling in of FIG. 1B. The larger distance between 45 and 44 dictates use of a larger lens 44, and also shifts the pupil image plane 42 closer to image plane 46. As a result, space limitations typically dictate placing lens 43 adjacent to illumination stop 42, and typically prior to the illumination stop along the optical path.

In the examples given below, reference will be made to an LCOS spatial light modulator, but it should be noted that this is a non-limiting example of a spatial light modulator, and that variant implementations employing other types of spatial light modulator may readily be implemented by a person having ordinary skill in the art on the basis of the description herein.

Optical Arrangement of Double PBS Incorporating Scanner

FIGS. 4A-4C shows an architecture equivalent to FIG. 3A based on two PBS (Polarizing Beam Splitters). Light source 51 transmits light onto PBS 40a, to lens 53 and onto scanning reflecting mirror 52. Hereafter, throughout this document, it is taken as a given that a quarter wave-plate is used after PBS reflection and before PBS transmission, and vice versa, as is known in the art, but this detail will be omitted for simplicity of presentation. The light reflects from mirror 52 and is transmitted through PBS 40a, reflected by mirror 57 (which may be a plane mirror as shown or may have optical power), reflected by PBS 40a and by PBS 40b so as to be directed onto LCOS imaging matrix 56. From the LCOS, the light pass through PBS 40b onto lens 54, back to PBS 40b and onto exit pupil 55 that is also the entrance pupil to the waveguide.

FIG. 4B shows only part of the rays that are focused on scanning mirror 52 and focus once again by the optics on pupil 55. This way the scanning mirror at image of exit pupil can perform scanning while maintaining illumination into pupil 55.

FIG. 4C shows a single point in image field that is focused on LCOS 56 and also being focused also in source plane 51. This way scanner 52 can scan illumination spot from 51 into LCOS 56. In preferred embodiment, if a single spot source is used (such as a laser) then a diffuser is placed in the optical path multiple pixels are illuminated on LCOS. Alternatively, the LCOS can be replaced by a reflecting lens (flat or curved) and laser maintained focused by imaging optics all the optical path without diffusers or other non-imaging components.

It is apparent that in configuration of FIGS. 4A-4C the distance between image plane 56 and the pupil image 52 is relatively large (as a result of a relatively short distance between pupil 55 and lens 54) therefore this configuration is more appropriate for diagonal coupling as described in FIG. 1A.

Figure 5A:
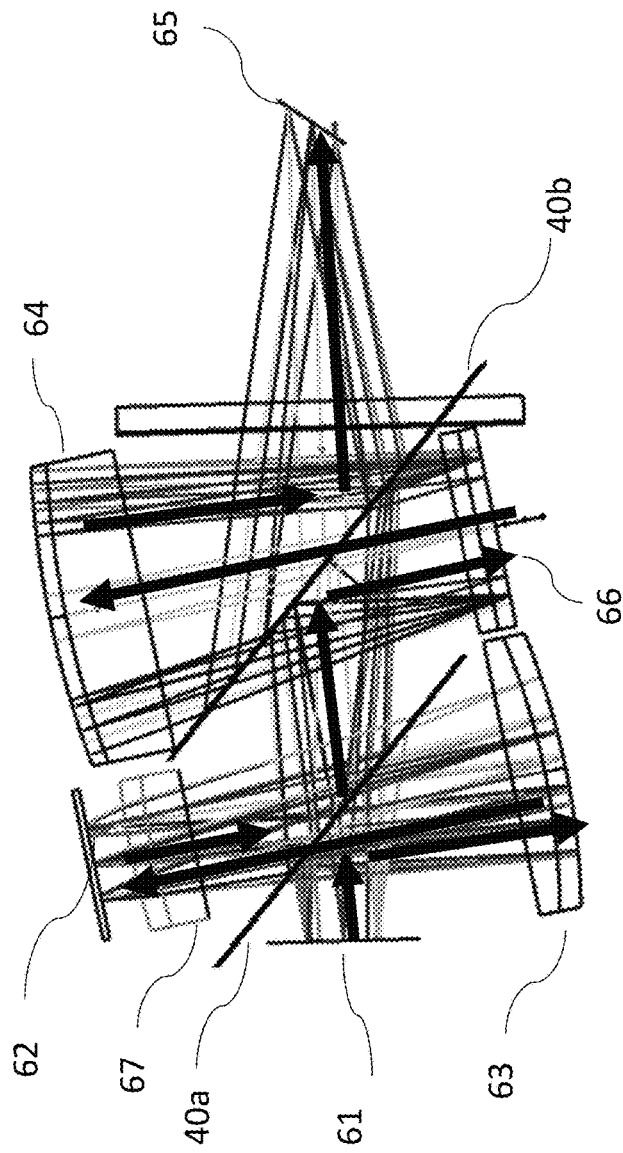
FIGS. 5A-5D are schematic side views of a second optical arrangement for implementing an image projector, constructed and operative according to an embodiment of the present invention, illustrating different subsets of the ray paths through the arrangement, with and without scanning mirror displacement.
Figure 5B:
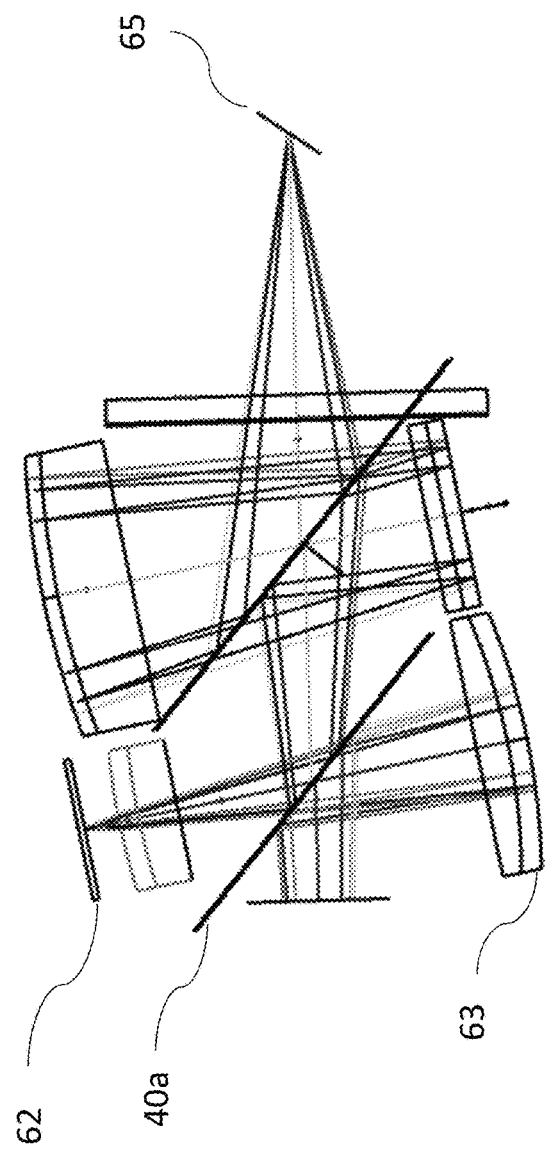

In FIG. 5A, the exit pupil 65 is further away from lens 64 therefore the scanning mirror 63 placed at shorter optical path from the image at 66 relative to the configuration in FIG. 4A. As shown in FIG. 5B, here exit pupil 65 is refocused to plane 62 without an additional optical path through PBS 40a. This configuration is equivalent to the one shown in FIG. 3B and useful when implementing the coupling arrangement shown in FIG. 1B.

Figure 5C:
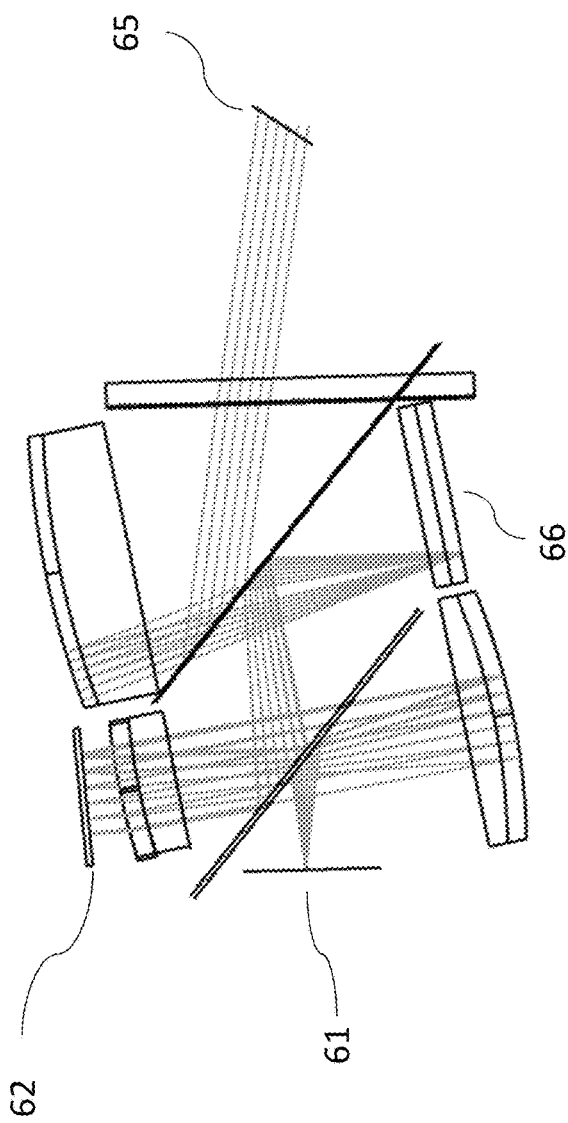
Figure 5D:
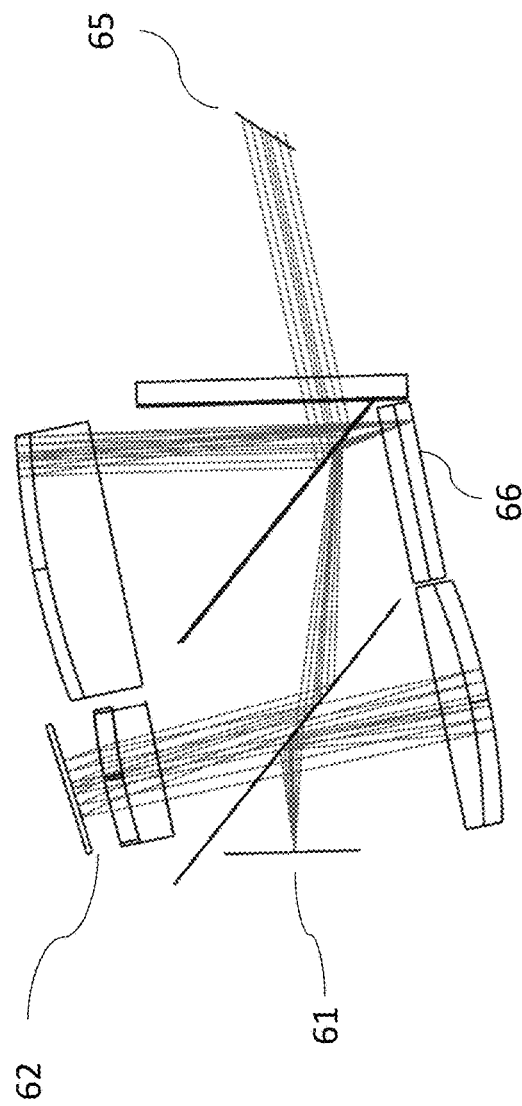

FIGS. 5C and 5D show scanning of mirror 62 so light source 61 illuminates different angular points of the field as exiting pupil 65 or as illuminating LCOS 66.

As previously mentioned, it is also possible to place a static mirror at 66 (without any spatial light modulator) and use a focused beam from a small-spot illumination source (e.g., laser beam, S-LED, edge-emitting diode or the like) for which the focused illumination spot at the focal plane is no larger than dimensions of a pixel of the image to achieve efficient image generation by scanning only.

Single Axis Scanner without Pupil Imaging

Figure 6A:
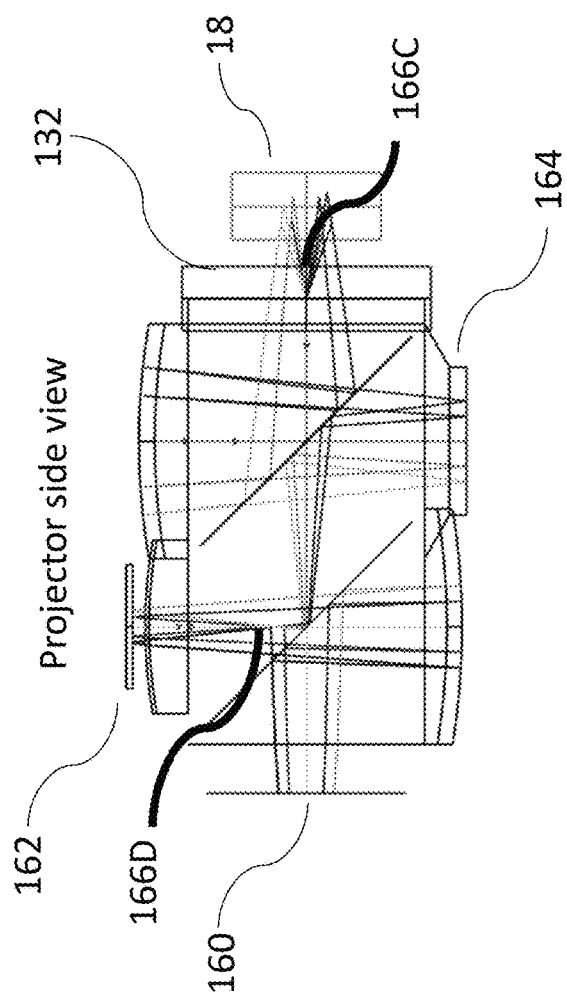
FIGS. 6A and 6B are a schematic side view and bottom view of a third optical arrangement for implementing an image projector and output waveguide, constructed and operative according to an embodiment of the present invention.
Figure 6B:
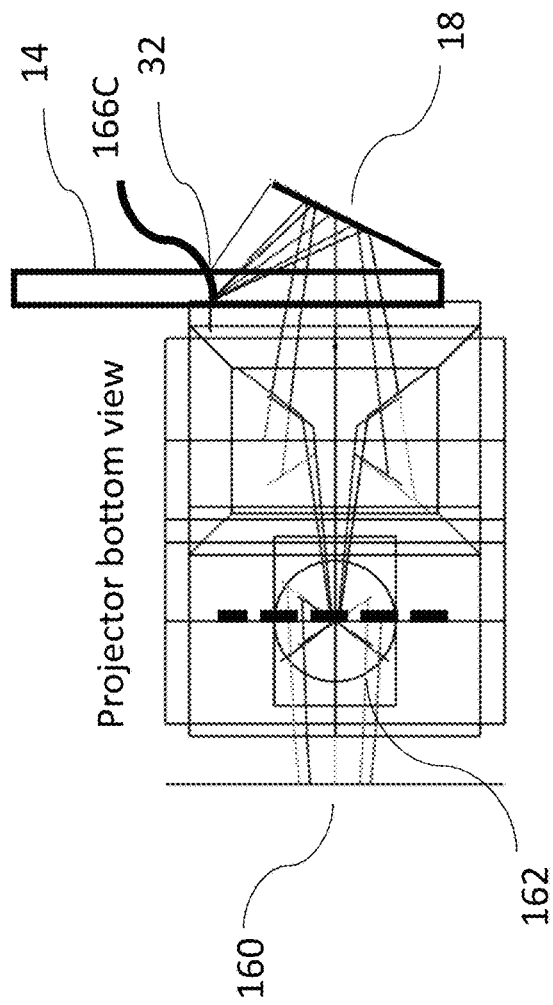

FIGS. 6A and 6B show an optical arrangement of a projector with perpendicular coupling as described in FIG. 1B. FIG. 6A shows a side view and FIG. 6B shows a bottom view. In this case, waveguide 14 has an entrance pupil defined by 32. The coupling orientation of reflecting mirror 18 is perpendicular to the orientation of the projector PBS, so that it is better seen in the bottom view of FIG. 6B.

Figure 2B:
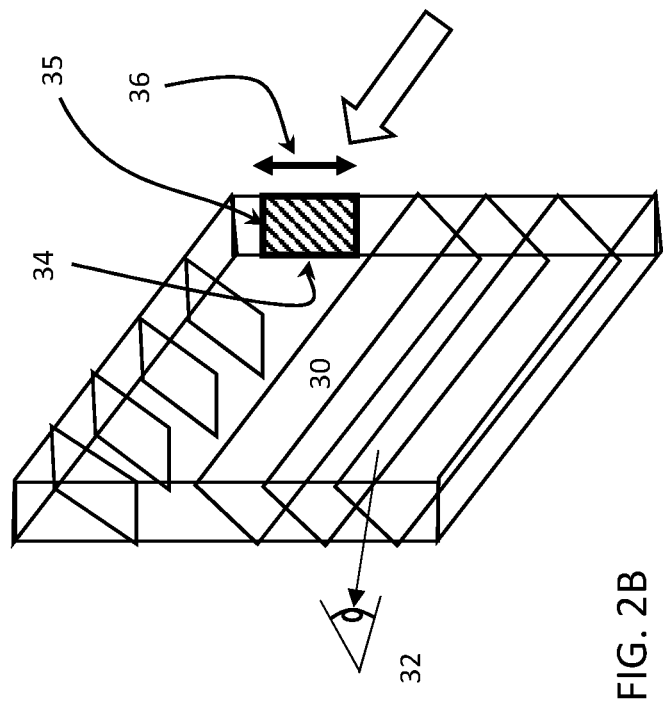
FIGS. 2A and 2B, discussed above, are schematic isometric views illustrating certain geometrical definitions relating to coupling-in of an image into a light-guide optical element.
Figure 2A:
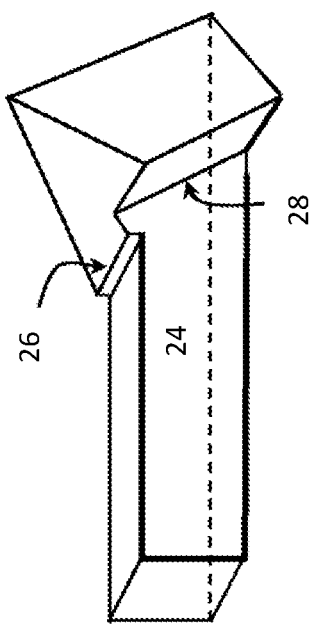

According to the principles set out thus far for preferred implementations, the entrance pupil 32 of the waveguide (shown as light rays focus 166C) would be imaged onto scanning mirror 162 (as was illustrated in FIGS. 4B and 5B). However, if the scanner scans only in one dimension and the scanning axis is as shown by the dashed line in FIG. 6B, then the pupil imaging requirement can be relaxed, provided that a suitable waveguide configuration is chosen. In this example, the image of the pupil is at 166D (not on mirror 162). In this case, the scanning will cause the exit pupil from the projector to travel along arrow 36 (FIG. 2B). This type of pupil movement along the waveguide does not degrade coupling efficiency, so long as the waveguide includes two-dimensional pupil expansion.

Separate Pupils

In certain embodiments of the present invention, such as will be described in more detail below, it may be desirable to perform two-dimensional scanning of the illumination across the image plane, typically in a raster pattern, where a first, more rapid, scanning direction is referred to as the primary scanning direction, and a direction perpendicular to the primary scanning direction is referred to as a secondary scanning direction. Although two-axis scanning can be performed using a single mirror, in many cases, lower costs and improved reliability can be achieved by employing two separate scanning mirrors, each with its own actuator, each providing tilt about a single axis. Where two single axis scanners are used, it is impossible to place these two axis mirrors in a single plane that is the image of the exit pupil. According to an aspect of the present invention, each single axis scanning mirror can be placed substantially at a plane containing an image of the effective waveguide pupil for the corresponding axis. These distinct locations for the waveguide pupil for two different axes are exemplified in FIG. 2A as edges 26 and 28, and in FIG. 2B as dimensions 34 and 35.

Figure 7A:
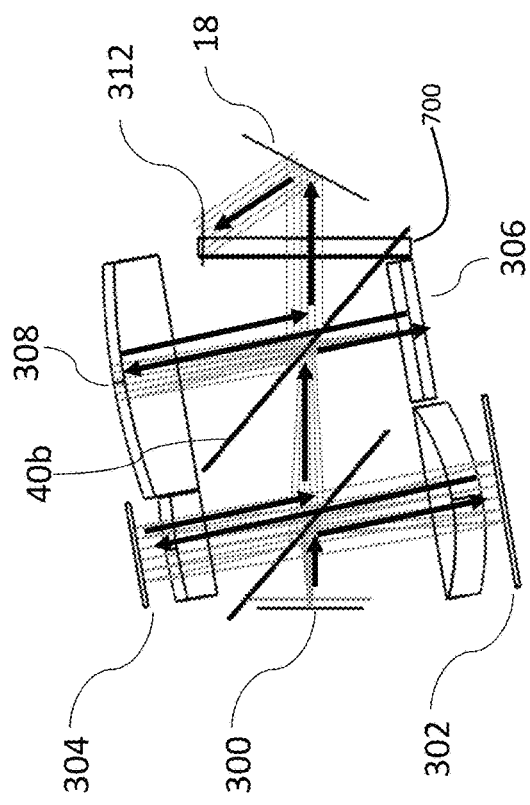
FIGS. 7A-7C are schematic side views of a fourth optical arrangement for implementing an image projector, constructed and operative according to an embodiment of the present invention, employing two single-axis tilt-mirror assemblies, illustrating different subsets of the ray paths through the arrangement.

FIG. 7A shows an exemplary system with two tilt-mirror assemblies including two distinct mirrors 302, 304, each with its own actuator as part of a driver (not shown). The light originates from source 300, is reflected onto first scanning mirror 302 then second scanning mirror 304. The light then continues to LCOS (or mirror) 306 and collimating lens 308, before being projected into the waveguide (not shown) where it impinges on folding mirror 18 and then waveguide entrance 312. This system is a further example of a system having two effectively distinct entrance apertures to the waveguide: the entrance pupil in the dimension in which the illumination is guided within the waveguide is delimited by waveguide aperture 312 (corresponding to edge 34 of FIG. 1B) while the pupil stop in the transverse dimension (perpendicular to the drawing plane) may be designed to lie at folding mirror 18 (although other locations are also possible).

Figure 7C:
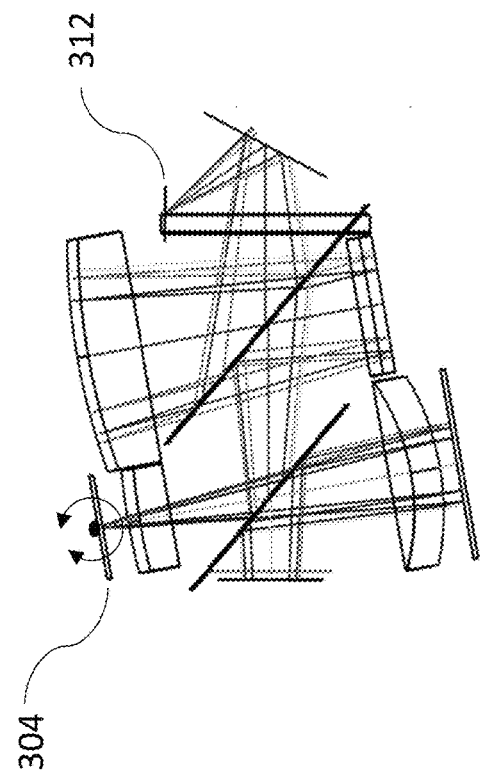
Figure 7B:
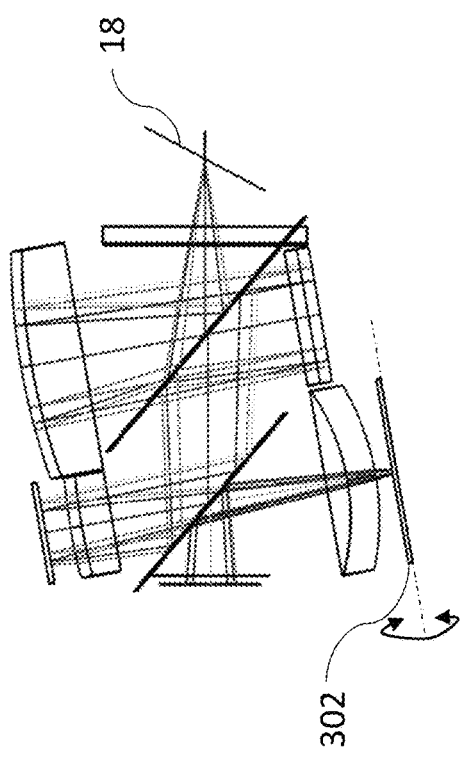

FIG. 7B illustrates that a point on folding mirror 18 is imaged to scanning mirror 302. It follows that the scanning axis of scanning mirror 302 should be horizontal to the page (shown by dot-dash line). FIG. 7C illustrates that a point on pupil plane 312 is imaged onto scanning mirror 304. It follows that scanning mirror 304 should be implemented with a rotation axis perpendicular to drawing plane.

Double Pupil Imaging

As an alternative to the approach of FIG. 7A, according to another aspect of the present invention, two-axis scanning can advantageously be achieved by twice imaging of the exit pupil 312 on both separated mirrors. FIG. 7D shows schematically how first pupil image 42V (vertical scanner) is reimaged onto another pupil image 42H (horizontal scanner).

FIGS. 7E and 7F show optical arrangement including double pupil imaging where a point source 300 is scanning the image without spatial image modulator. FIG. 7E shows point from exit pupil 312 is imaged onto first vertical scanning mirror 42V and being reimaged onto horizontal scanning mirror 42H. FIG. 312 shows that point source is collimated at exit pupil 312. This architecture can be used to advantage when scanning with a single laser or other single-pixel illumination source modulated to generate an image. Alternatively, it may be used to advantage with various multi-source illumination schemes, and is particularly suited to the various "spaced sources" illumination schemes described below.

Scanned Illumination Schemes

Up to this point, a number of novel optical arrangements have been presented to provide capabilities of scanned illumination, either as a primary image generation mechanism or for use in combination with a spatial light modulator. Presented below are a number of particular implementations which are facilitated by, and can advantageously be implemented using, one or more of the above optical arrangements.

Figure 11:
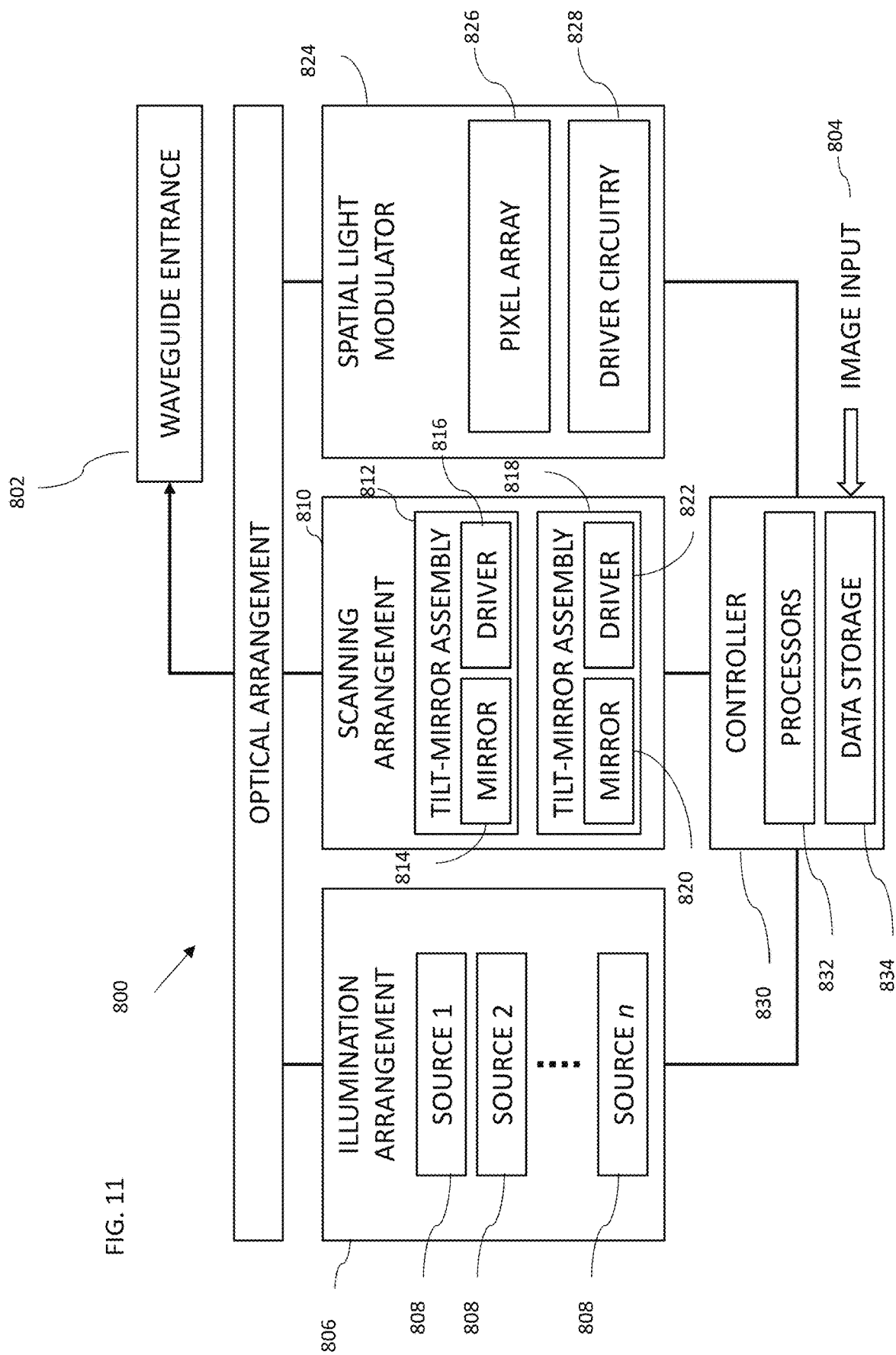
FIG. 11 is a block diagram of a system for implementing various embodiments of the present invention.

By way of introduction, FIG. 11 is a block diagram illustrating the main components of an image projector, generally designated 800, for projecting a collimated image via an exit stop for injection into an input stop of a light-guide optical element (waveguide entrance 802). The collimated image is a representation of a digital image with a certain desired field of view, as provided to the system as an image input 804. In general terms, image projector 800 includes an illumination arrangement 806 which includes a plurality of illumination sources 808, numbered here as sources 1, 2 ... n (although certain implementations may have only two illumination sources). The types of illumination sources 808 used, and the relative deployment of those sources, will be discussed in detail below in the context of each application. A scanning arrangement 810 includes at least one tilt-mirror assembly 812 that has a mirror 814 and a driver 816 for driving tilt motion of the mirror 814. The tilt-mirror assembly may be implemented using a range of commercially available products well known in the art. Where two-axis scanning is required, either a two-axis tilt-mirror assembly may be used, also as commercially available, or a single axis tilt-mirror assembly 812 may be used as a primary scanning mechanism, supplemented by a secondary tilt-mirror assembly 818 with its own mirror 820 and driver 822.

Various aspects of the present invention (although not all, as detailed below) also employ a spatial light modulator (SLM) 824 having individually controlled pixel elements in a pixel array 826 driven by suitable driver circuitry 828, all as is well known in the art. The SLM may employ any suitable technology, such as for example LCD for transmission configurations or an LCOS or a DLP device for reflective configurations. In each case, the SLM is in itself typically a standard commercially available product.

A controller 830, typically including one or more processors 832 and at least one data storage device 834, is provided in electronic connection with spatial light modulator 824 (if present), tilt-mirror assembly driver(s) 816 (and 822 if present) and the illumination arrangement 806. Controller 830 may be implemented using dedicated circuitry, general purpose processors operating under suitable software, or any other combination of hardware, firmware and/or software, as is known in the art. Furthermore, the structure and functions of controller 830 may be subdivided between two or more physical subsystems, and some of its functions may be performed by remote devices and/or dynamically allocated resources of a virtual machine or otherwise defined "cloud" computer.

The optical relationships between the various components are defined by an optical arrangement 836 including a plurality of optical elements (typically including collimating optics and illumination optics based on any combination of reflective and/or refractive lenses, mirrors, beam splitters, quarter wave-plates, and transparent blocks defining surfaces for maintaining components in optical alignment. Examples of suitable optical arrangements for implementing various aspects of the present invention may be found in the designs of FIGS. 3A-7C, as described above.

In general, the various elements of optical arrangement 836 are deployed so as to direct illumination from plurality of illumination sources 808 towards mirror 814 (and 820 if present), to direct the illumination reflected from the mirror(s) towards the SLM 824 (where present), and to collimate illumination from SLM 824 to generate a collimated image directed to the exit stop and the waveguide entrance.

Although the present invention may be implemented using solely refractive optical components and free-space optics, it is considered preferable in many cases to employ implementations without an air gap in the optical path between the illumination optics and the exit stop, and most preferably, from the illumination stop to the exit stop. At least some if not all elements with optical power are preferably implemented as reflective lenses. The optical path of the devices described herein typically includes certain components, such as laser light sources and scanning mirror components, which inherently include some internal air space. Even here, however, the components are preferably encapsulated components which can be integrated with the rest of the optical system without any "inter-component air gaps", i.e., where there are no air gaps other than internal spaces within encapsulated components. The use of an architecture without inter-component air gaps helps to ensure minimal performance degradation over time due to environmental changes or penetration of dirt into the system.

Various implementations of the present invention as described herein employ a plurality of independently controllable (i.e., intensity modulated) illumination sources which each scan across an SLM while instantaneously illuminating a plurality of pixel elements. In other words, illumination from each of the illumination sources generates a patch of illumination illuminating a plurality of the pixel elements of the spatial light modulator, and the intensity of illumination of each patch is varied as the scanning arrangement moves the illumination pattern across the SLM. The resulting sequential illumination of different regions of the two-dimensional pixel array allows savings in illumination power in various ways. Firstly, in regions where no image content is required, the illumination source need not be actuated, thereby saving significant power. An example of such an application is an augmented reality application where much of the display area is left inactive, to allow an undisturbed review of the real world, and only selected regions of the display are actuated to provide the augmented reality content.

In other situations, even where a region of the display is active, it may still be possible to save display power in accordance with a local maximum required display intensity. Specifically, according to a further aspect of certain implementations of the present invention, the display controller is configured to: (a) determine a maximum required intensity of a pixel of the digital image in a part of the digital image corresponding to each of the regions of the two-dimensional array; (b) determine a reduced illumination level for at least one of the regions sufficient to generate the corresponding maximum required intensity within the regions; (c) generate a modified pixel intensity map for pixels within the at least one region for generating a required projected image intensity based on the reduced illumination level; and (d) actuate the illumination arrangement to illuminate at least one region with the reduced illumination level while the pixel elements within the at least one region are actuated according to the modified pixel intensity map.

Figure 12:
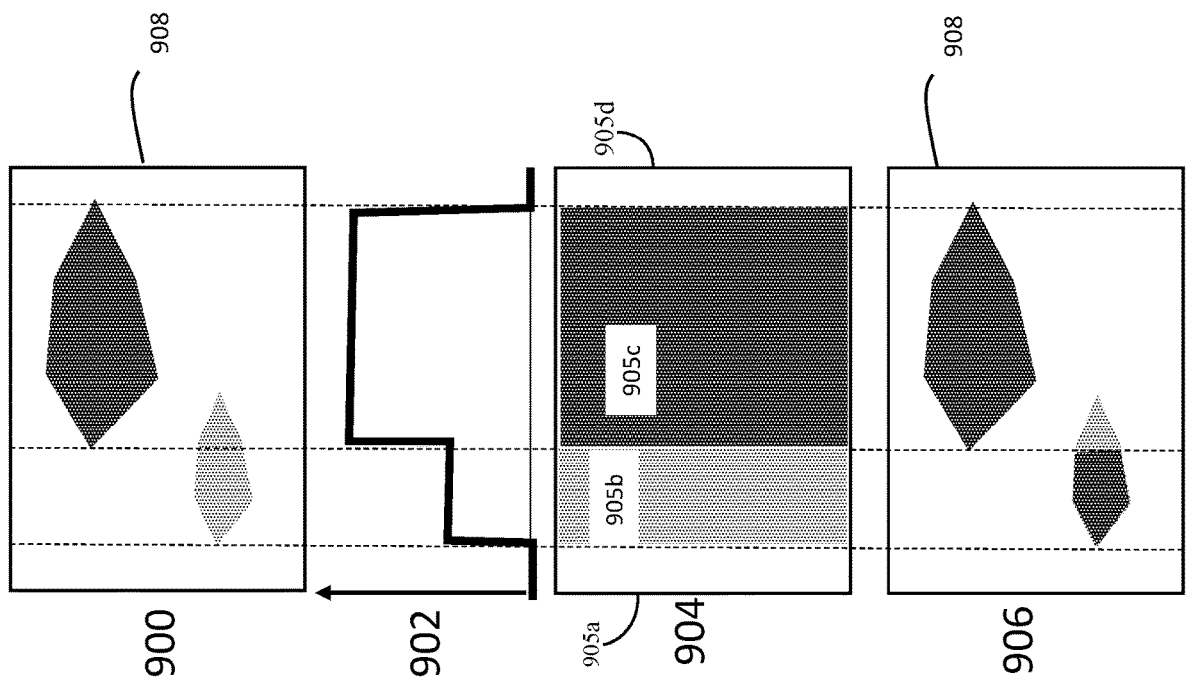
FIG. 12 is a schematic representation of a reduced-intensity illumination scheme employing variable intensity illumination.

This feature is illustrated here with reference to a one-dimensional scanning pattern, but can equally be implemented for more complex illumination scanning patterns. FIG. 12 illustrates a simple pattern 900 (for illustrative purposes) corresponding to an input image for display over a field of view 908. The input image has variable image intensity over field of view 908. The darker image here portrays higher intensity. This image is for a single color and three such images generate every frame for all colors. The dashed lines are for ease of reference to features between the different representations of the Figure. Parenthetically, whenever reference is made herein to a "field of view", this refers interchangeably to the span of angles (angular field of view) spanned by pixels of the image in the collimated image at the projector exit pupil and to the spatial field of view at the image plane (e.g., LCOS surface).

If the LCOS were to be scanned with a beam at constant maximum intensity, this image as illustrated in pattern 900 would be loaded as is, and scanning with the maximum intensity beam would generate the desired output image. As an alternative, according to an aspect of the present invention, graph 902 illustrates a "maximum required intensity" for each column of FIG. 900. This pattern is then used to set a corresponding profile of laser intensity as the illuminating pattern (here assumed to be a line spanning a dimension perpendicular to the primary scanning direction) scans across the LCOS. In a region for which the illumination intensity is reduced, less attenuation is required from the LCOS 824. Image 904 shows the resulting illumination intensity across the LCOS. At beginning of scan (covering area 905*a* of the array) there is no laser illumination. For area 905*b*, an intermediate intensity is used, corresponding to a "reduced illumination level". Area 905*c* is illuminated with maximal intensity and at the final section (area 905*d*) requires no illumination.

Image 906 corresponds to a modified pixel intensity map such that the product of the modified pixel intensity of 906 and the illumination level for a given column (or more generally, illumination region) from 904 will generate the desired output image intensity 900. Thus, the image 906 (the actual image loaded to the LCOS) is generated by dividing the required image 900 by the illumination image 904.

In practice, each illumination region typically covers a number of columns in the scanning direction simultaneously and, as a result, the illumination image 904 will typically be smooth with gradual transitions, even if the illumination output is driven by a step function, as the overall intensity of illumination for each column will be the integral of the illumination as the illumination line passes. The calculation of the loaded image 906 as the desired output image 900 divided by the illumination level 904 remains valid. In each case, controller 830 drives the spatial light modulator 824 in coordination with modulation of an intensity of each of the illumination sources 808 synchronously with the tilt motion of the mirror 814 to generate a reproduction of the digital image.

Vector of Sources

In certain implementations of the present invention, the plurality of illumination sources 808 include at least one group of individually controlled illumination sources generating a substantially continuous illumination pattern spanning at least part, and in some cases the entirety, of a dimension of the field of view perpendicular to the primary scanning-direction dimension of the field of view. This reduces the required repetition frequency and/or scanning motion speed required by the scanning arrangement.

Figure 8C:
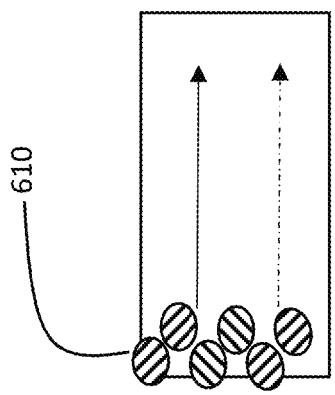
FIGS. 8A-8D are schematic representations of various illumination patterns and corresponding scanning patterns for use in an image projector according to the teachings of an embodiment of the present invention.
Figure 8B:
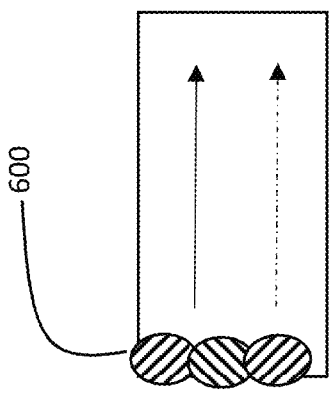
Figure 8D:
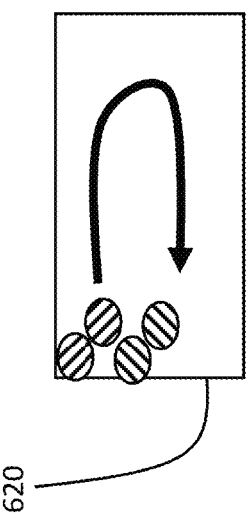
Figure 8A:
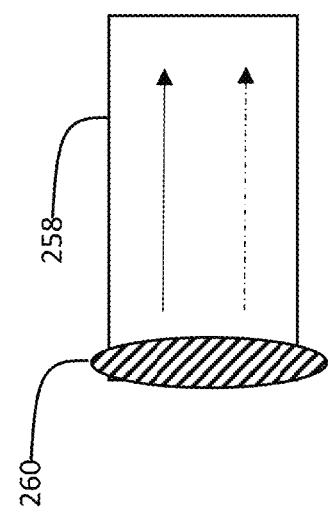

FIG. 8A shows an architecture where the light from source (for example 51 or 61) is distributed as a line or other oblong shape 260 as imaged across LCOS active area 258 (56 or 66). This line distribution can be generated by an elliptical diffuser placed along the optical path before or near the scanning mirror. It can also be generated by imaging the emitting output facet of a laser onto the LCOS, or by a combination of the above.

Here and in other examples, illumination source 808 is most preferably a laser, and is collimated by suitable optics onto scanning mirror 814, preferably implemented as a high-speed mirror (typically using MEMS technology). Non-collimated illumination may also be used, as long as the SLM is properly illuminated. It is preferable that the spot size is large enough to cover a relatively large number of pixels at any instant, typically at least 10, preferably at least 100, and in some preferred cases at least 1000 pixels or in excess of 10,000 pixels (e.g., 100×100 pixels or larger), thereby reducing scanning speed requirements. The shape of the illuminating spot can be modified, for example, by the shape of the emitter beam from source 808, optical properties of the source collimation optics, deployment of a diffuser on the scanning mirror and/or deployment of a diffuser in the illumination path. Where diffusers are used, the diffuser is preferably a structured diffuser with a specifically chosen angular distribution of the output light, such as those commercially available from RPC Photonics (NY, USA).

In contrast to the single source illustrated in FIG. 8A, FIGS. 8B-8D illustrate more preferred implementations in which at least one group of individually controlled illumination sources generating a substantially continuous illumination pattern spanning at least part, and in some cases the entirety, of a dimension of the field of view perpendicular to the primary scanning-direction dimension of the field of view. In this case, the scanning motion is preferably such that the illumination patch from each individual illumination source does not scan over the entire image field of view, but that the plurality of illumination sources (for any given color) together with the scanning motion ensure that the entire active area of the SLM 824 is covered (for each color).

FIG. 8B shows the illumination distribution of an array of lasers 600 (in this case three lasers placed in a line at source plane 51 or 61) where every laser illuminates a strip or patch that is individually only part of a dimension of the LCOS, but together span an entirety of one dimension of the LCOS. This allows the use of simple one-axis scanning by tilt-mirror assembly 812 to cover the entire active area of the SLM. Each strip or patch illuminates multiple pixels of the LCOS simultaneously. The intensity of each laser is modulated according to the maximum image intensity required in the corresponding strip or patch, and the intensity of the LCOS pixels are modulated in order to provide the desired pixel intensity scaled according to the illumination intensity, as explained above with reference to FIG. 12. Thus, if the maximum pixel intensity within the region corresponding to a certain laser at a certain position is 60% of the maximum intensity, the corresponding laser is preferably actuated at 60% intensity, while LCOS pixels with 60% intensity will be actuated at 100% (maximum) intensity and pixels requiring 40% intensity output will be actuated at 66% intensity. If in the neighboring region there is a pixel requiring 80% intensity, the corresponding laser is preferably actuated at 80% intensity, and any pixel in that region requiring 40 intensity will be actuated at 50% brightness level.

The same principles can be applied with slightly more complex calculations where a continuous scanning action is used, and the overall pixel intensity depends on the integral of the illumination intensity for the period the laser illumination pattern is passing across a given pixel as well as the pixel intensity setting. As previously described, a rectangular or elliptical diffuser (or circular as shown) can be used to generate the illumination pattern for each laser, but with lower angular divergence than that of FIG. 8A.

If mechanical limitations prevent placing the lasers side-by-side then a staggered configuration may be used, as shown schematically in FIG. 8C. A staggered configuration is also possible if different arrays are needed for the different colors (e.g., R, G and B). In this case, the linear scanning motion should be long enough to ensure that each illumination region scans across the entire active area of the LCOS.

FIG. 8D shows schematically that the staggered configuration can also be used for 2D scanning thereby enabling reduced scanning speed of the second axis of the scanner.

The scanner can be activated in step-and-illuminate mode if the image of the illuminating source covers a substantial area of the LCOS.

Here a laser refers to a high brightness source. For example, a bright LED with small divergence (such as an S-LED or edge-emitting LED) can also be used.

Scanning Spaced Sources

As an addition, or alternative, to the contiguously grouped illumination patterns described above, according to another aspect of the present invention, certain implementations of the present invention employ illumination sources that are spaced apart to reduce the angular extent of a scanning motion which is required to span a field of view of the image to be projected. Specifically, by using spaced-apart illumination sources, the tilt motion of tilt-mirror assembly 812 can be reduced such that illumination from each of the illumination sources scans across only part of one dimension of the field of view while illumination from the plurality of illumination sources together scans across the entirety of the one dimension.

By way of introduction to this feature, and for the purpose of facilitating an understanding of the invention without in any way limiting the invention to any specific theoretical basis, the scanning mirrors of the projector must typically preserve the etendue (product of angular and spatial size) of the system. For example if the entrance pupil to the waveguide is 2.5 mm and the angular field of the image injected is 40 degrees then the etendue will be:

$$2.5 \text{ [mm]} \times 40 \text{ [deg]} = 100 \text{ [mm deg]}$$

The scanning mirror must fulfill this parameter by having the product of size and angular tilt having same value. For example, a mirror having aperture of 2 mm must have an optical scan angle of:

$$100 \text{ [mm deg]} / 2 \text{ [mm]} = 50 \text{ [deg]}.$$

Figure 9A:
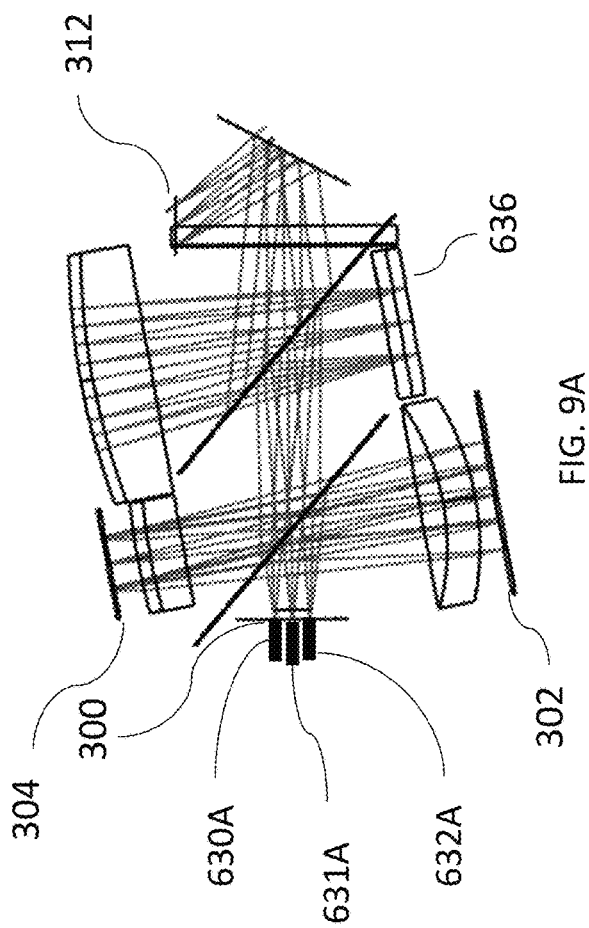
FIG. 9A is a schematic side view of an optical arrangement similar to FIG. 7A illustrating use of spaced-apart illumination sources to achieve reduced scanning angle requirements.

However, in many cases it is difficult to obtain large aperture and large angular scan at same component. According to an aspect of the present invention, spaced sources are used to segment the image field, thereby reducing etendue requirements of the scanning mirror. This configuration is applicable for illuminating an image generating matrix (LCOS) as previously described or for laser point scan of the image, where modulation of scanned laser point illumination is the sole image generation mechanism. FIG. 9A shows architecture similar to FIG. 7A in which laser sources 630A, 631A and 632A are equivalent laser sources individually modulated while surface 636 is a reflecting mirror (or lens) without an SLM. This way the lasers beams are collimated when exiting pupil 312 into the waveguide. Scanners 304 and 302 are positioned at appropriate pupil image locations (as explained above with reference to FIG. 7A) and have appropriate size.

Figure 9D:
FIGS. 9B-9D are schematic representations of various illumination patterns and corresponding scanning patterns for use in an image projector according to FIG. 9A.
Figure 9C:
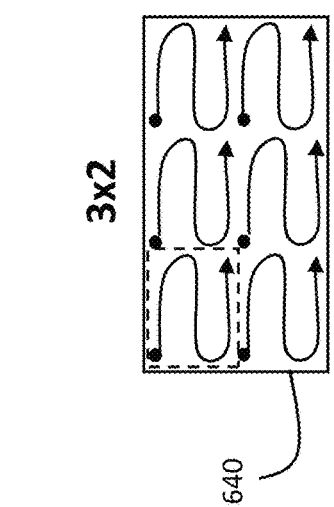
Figure 9B:
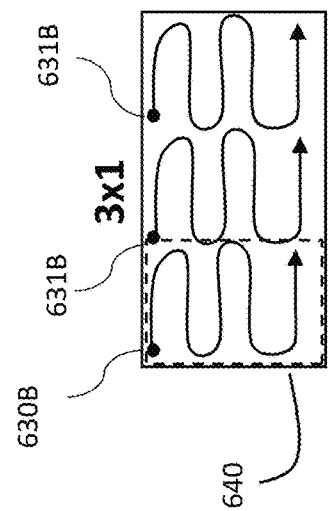

The equivalent laser sources illuminate points 630B-632B (respectively) in different sub-fields of the image field 640 as shown in FIG. 9B. The points in the field 630B, 631B and 632B are the angular illumination points (size as small as possible and defines image sharpness) within aperture 312 as generated by the corresponding lasers. These spots are scanned across the field as shown schematically by curved line arrows. The arrangement of 3×1 lasers illumination separates the image field 640 to three (in this example) smaller sub-fields associated with every laser show as dashed rectangle. Consequently, the required angular scanning amplitude of mirror 304 (the primary high-speed scanner) is reduced by a factor of 3 to: 50/3=17 degrees of optical deflection (side to side). During the scan, every laser is modulated individually in order to generate the appropriate part of the image being scanned by the specific laser.

In FIG. 9C, a 3×2 arrangement is shown, so that the horizontal angular image scanning (by mirror 304) is again divided by 3 while the vertical scanning by mirror 302 is divided by two.

FIG. 9D shows the color sources to be angularly separated. Here the color lasers 637R, 637G and 637B are separated (for example by spatial location in plane 300). The scanning mirrors scan the illumination angler points across the image simultaneously for all sub-fields and colors.

The multiple separated lasers in FIG. 9 are each responsible for providing only a subsection of the overall image brightness, and can therefore provide a higher brightness display output without exceeding eye-safety levels.

In a system with direct laser illumination (no LCOS), the placement of lasers at 300 can be on a curved profile according to field curvature of the optics. Specifically, every laser may advantageously be placed at an average focal distance of its assigned sub-field. This way a substantial part of the field curvature can be compensated for.

Although suitable for implementing a direct-scanning image generation mechanism, this aspect of the invention is not limited to such applications, and can also be used to advantage according to the principles described above, where each illumination source illuminates a group (plurality) of pixels of a SLM located at plane 636. In this case, each of the aforementioned spaced-apart illumination sources is advantageously part of a group of illumination sources that cooperate to generate a substantially continuous illumination pattern spanning at least part of the field of view perpendicular to the primary scanning-direction dimension of the field of view.

Switching Sources

Turning now to FIGS. 10A-10D, there is illustrated a further aspect of the present invention according to which a tilt-mirror assembly is used to switch between illumination sources of different colors. Specifically, the plurality of illumination sources 808 here include illumination sources of different colors, and the controller 830 drives the scanning arrangement driver 816 to displace mirror 814 between at least a first position, in which the spatial light modulator 824 is fully illuminated by a first of the illumination sources, and a second position, in which the spatial light modulator is fully illuminated by a second of the illumination sources, thereby switching between colors of illumination. Controller 830 also actuates the spatial light modulator 824 synchronously with switching between colors of illumination to generate corresponding content of the digital image for each of the colors of illumination. This eliminates the need to employ a light-pipe or diffuser to mix illumination sources of different colors.

FIG. 10A shows a first position of a scanning mirror 506. In this position, the center LED 660 is imaged onto the LCOS 507. FIG. 10B shows the footprint of the LCOS 680 on the center LED 660, preferably providing full frame illumination by LED 660.

FIG. 10C shows scanning mirror 506 tilted in a second position. In this state, LED 670 (for example having a different color) is activated and imaged onto the LCOS 507 as shown by the footprint 680 in FIG. 12D. This illumination switch is synchronized with loading of the corresponding color separation image onto the LCOS. A fast sequence of illumination switch between different color LEDs and appropriate image loading generates a perceived full color image.

Optionally, the LED configuration can also include a white LED (not shown) in addition to the three RGB LEDs.

Part or all of the LEDs 650, 660 and 670 can be replaced with a matrix of a single color mini-LEDs thereby achieving sequential selective illumination per color. In this case, the appropriate illumination pattern is loaded to the illumination matrix in sync with loading to the LCOS.

Part or all of the LEDs 650, 660 and 670 can be replaced with a laser illuminated diffuser, thereby achieving more collimated illumination (less loss) while the mirror 506 vibrates slightly during each laser illumination to eliminate speckles.

It will be appreciated that the above descriptions are intended only to serve as examples, and that many other embodiments are possible within the scope of the present invention as defined in the appended claims.

What is claimed is:

1. An image projector for projecting a collimated image via an exit stop for injection into an input stop of a light-guide optical element, said collimated image being a representation of a digital image with a field of view, the image projector comprising:
    (a) an illumination arrangement comprising a plurality of illumination sources;
    (b) a tilt-mirror assembly comprising a mirror and a driver for driving tilt motion of said mirror;
    (c) a controller in electronic connection with said driver and said illumination arrangement; and
    (d) an optical arrangement comprising a plurality of optical elements deployed to:
        (i) direct illumination from said plurality of illumination sources towards said mirror;
        (ii) direct the illumination reflected from said mirror towards an image plane; and
        (iii) collimate illumination from said image plane to generate a collimated image directed to said exit stop,
    wherein said controller modulates an intensity of each of said illumination sources synchronously with said tilt motion of said mirror according to the content of the digital image,
    and wherein an angular extent of said tilt motion about a tilt axis is insufficient to scan illumination from each of said illumination sources in a corresponding scanning direction across an entire dimension of the field of view, and wherein said plurality of illumination sources are spaced apart such that said tilt motion causes the illumination from each of said illumination sources to scan across respective majority-non-overlapping segments of the field of view, said segments together spanning the entirety of said dimension.

2. The image projector of claim 1, wherein said optical arrangement substantially images said mirror to said exit stop.

3. The image projector of claim 1, wherein said tilt-mirror assembly is part of a two-axis scanning arrangement such that illumination from each of said illumination sources scans across said image plane in a two-dimensional scanning pattern.

4. The image projector of claim 3, wherein said spaced-apart illumination sources are part of a two dimensional array of illumination sources spaced apart in two dimensions, and wherein said two-dimensional scanning pattern is such that illumination from each of said illumination sources scans across only part of each dimension of the field of view while illumination from the plurality of illumination together scans across the entirety of both dimensions of the field of view.

5. The image projector of claim 1, wherein each of said spaced-apart illumination sources is part of a group of illumination sources that cooperate to generate a substantially continuous illumination pattern spanning a dimension of the field of view perpendicular to a scanning-direction dimension of the field of view.

6. The image projector of claim 1, wherein said optical arrangement is configured to focus the illumination reflected from said mirror at said image plane such that each of said illumination sources generates an instantaneous spot at said image plane corresponding to a single pixel of said digital image.

7. The image projector of claim 1, further comprising a spatial light modulator deployed at said image plane, and wherein said optical arrangement is configured to generate a patch of illumination from each of said illumination sources illumination a plurality of pixel elements of said spatial light modulator, said spatial light modulator being driven by said controller in coordination with said illumination arrangement to generate a reproduction of the digital image.

8. The image projector of claim 1, wherein all of said plurality of illumination sources are of a single color, and wherein each of said plurality of illumination sources is associated with two additional illumination sources of different colors, making up a triplet of red, green and blue colored illumination sources.

9. An image projector for projecting a collimated image via an exit stop for injection into an input stop of a light-guide optical element, said collimated image being a representation of a digital image with a field of view, the image projector comprising:
(a) an illumination arrangement comprising a plurality of illumination sources of different colors;
(b) a tilt-mirror assembly comprising a mirror and a driver for driving tilt motion of said mirror between a plurality of positions;
(c) a spatial light modulator having individually controlled pixel elements;
(d) a controller in electronic connection with said spatial light modulator and said driver; and
(e) an optical arrangement comprising a plurality of optical elements, said optical arrangement being configured to:
(i) direct illumination from said plurality of illumination sources towards said mirror;
(ii) direct the illumination reflected from said mirror towards said spatial light modulator such that illumination from one of said illumination sources illuminates said spatial light modulator; and
(iii) collimate illumination from said spatial light modulator to generate a collimated image directed to said exit stop,
wherein said controller drives said driver to displace said mirror between a first of said positions, in which said spatial light modulator is fully illuminated by a first of said illumination sources, and a second of said positions, in which said spatial light modulator is fully illuminated by a second of said illumination sources, thereby switching between colors of illumination, said controller actuating said spatial light modulator synchronously with switching between colors of illumination to generate corresponding content of the digital image for each of the colors of illumination.

10. The image projector of claim 9, wherein, in each of said positions of said mirror, said optical arrangement is configured to focus an image of one of said illumination sources onto said spatial light modulator.

11. An image projector for projecting a collimated image via an exit stop onto an entrance stop of a light-guide optical element, said collimated image being a representation of a digital image with a field of view, the image projector comprising:
(a) an illumination arrangement comprising at least one illumination source;
(b) a first tilt-mirror assembly comprising a first mirror and a first driver for driving tilt motion of said first mirror about a first tilt axis;
(c) a second tilt-mirror assembly comprising a second mirror and a second driver for driving tilt motion of said second mirror about a second tilt axis;
(d) a controller in electronic connection with said first and second drivers and with said illumination arrangement; and
(e) an optical arrangement comprising a plurality of optical elements deployed to:
direct illumination from said at least one illumination source towards said first mirror;
(ii) direct the illumination reflected from said mirror towards said second mirror; and
(iii) collimate illumination from said second mirror to generate a collimated image directed to said exit stop,
wherein said controller modulates an intensity of said at least one illumination source synchronously with said tilt motion of said first and second mirrors according to the content of the digital image,
and wherein said optical arrangement is configured such that both said first mirror and said second mirror are located substantially in planes containing an image of the entrance stop of the light-guide optical element.

12. The image projector of claim 11, wherein said at least one illumination source is implemented as a plurality of spaced-apart illumination sources, and wherein said tilt motion of one of said first and second mirrors is such that illumination from each of said illumination sources scans across only part of one dimension of the field of view while illumination from the plurality of illumination sources together scans across the entirety of the one dimension.

13. The image projector of claim 12, wherein said spaced-apart illumination sources are part of a two dimensional array of illumination sources spaced apart in two dimensions, and wherein said tilt motion of each of said first and second mirrors is such that illumination from each of said illumination sources scans across only part of each dimension of the field of view while illumination from the plurality of illumination together scans across the entirety of both dimensions of the field of view.

* * * * *